US009369529B2

(12) United States Patent
Fujigaki

(10) Patent No.: US 9,369,529 B2
(45) Date of Patent: Jun. 14, 2016

(54) SERVER SYSTEM AND METHOD OF CONTROLLING CLIENT APPARATUS

(75) Inventor: Hayato Fujigaki, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 1144 days.

(21) Appl. No.: 13/405,641

(22) Filed: Feb. 27, 2012

(65) Prior Publication Data

US 2012/0221628 A1    Aug. 30, 2012

(30) Foreign Application Priority Data

Feb. 28, 2011   (JP) ................................ 2011-041315

(51) Int. Cl.
*G06F 15/16*    (2006.01)
*H04L 29/08*    (2006.01)

(52) U.S. Cl.
CPC ............ *H04L 67/141* (2013.01); *H04L 67/146* (2013.01); *H04L 67/148* (2013.01); *H04L 67/08* (2013.01)

(58) Field of Classification Search
None
See application file for complete search history.

(56) References Cited

U.S. PATENT DOCUMENTS

| 6,111,570 | A | 8/2000 | Sugikawa et al. |
| 6,356,437 | B1* | 3/2002 | Mitchell ................ G06F 1/163 342/352 |
| 7,061,449 | B2* | 6/2006 | Oya et al. ....................... 345/2.3 |
| 8,095,913 | B2* | 1/2012 | Kodaka et al. ................ 717/124 |
| 9,217,868 | B2* | 12/2015 | Jacobsen ............ G02B 27/0172 |
| 2002/0094845 | A1* | 7/2002 | Inasaka ......................... 455/566 |
| 2005/0108411 | A1* | 5/2005 | Kliland et al. ........ H04L 63/029 709/230 |
| 2007/0220108 | A1* | 9/2007 | Whitaker ....................... 709/217 |
| 2009/0247136 | A1* | 10/2009 | Srinivasan et al. .......... 455/414.2 |
| 2009/0251409 | A1* | 10/2009 | Parkinson ............ G02B 27/017 345/156 |
| 2011/0169928 | A1* | 7/2011 | Gassel et al. ..................... 348/53 |
| 2011/0208857 | A1* | 8/2011 | Gentile et al. ................. 709/224 |

FOREIGN PATENT DOCUMENTS

| JP | A-10-233772 | 9/1998 |
| JP | A-2000-122957 | 4/2000 |
| JP | 2003-87363 A | 3/2003 |
| JP | 2003-219485 A | 7/2003 |

OTHER PUBLICATIONS

Japanese Office Action dated Sep. 16, 2014 from related Japanese Patent Application No. 2011-041315, together with an English language translation.

* cited by examiner

*Primary Examiner* — Thomas Dailey
(74) *Attorney, Agent, or Firm* — Scully, Scott, Murphy & Presser, PC

(57) ABSTRACT

A server system includes a session information storage section that stores session information, the session information being information that links identification information about a first client apparatus and identification information about a second client apparatus, a processing section that generates operation screen information, the screen information being information for displaying an operation screen used to operate the second client apparatus on the first client apparatus, and a communication section that transmits the operation screen information to the first client apparatus, the processing section linking the first client apparatus and the second client apparatus based on the identification information transmitted from the first client apparatus and the session information, and generating the operation screen information.

14 Claims, 18 Drawing Sheets

| MAC ADDRESS OF SECOND CLIENT APPARATUS | PRIVATE IP ADDRESS OF SECOND CLIENT APPARATUS | USER NAME | PASS-WORD | DISPLAY DATA FOR FIRST CLIENT APPARATUS |
|---|---|---|---|---|
| 00:FF:1B:AA:BB:DD | 192.168.0.2 | user1 | password1 | <html> ··· </html> |
| 00:FF:1B:AA:BB:EE | 192.168.1.10 | user2 | password2 | <html> ··· </html> |
| ... | ... | ... | ... | ... |

FIG. 5A
BEFORE PROCESSING

```
<html>
<head>
<title>APPLICATION LIST</title>
</head>
<body>
...
http://{[HMD_URL]}/?command=key&action=up
...
</body>
</html>
```

FIG. 5B
AFTER PROCESSING

```
<html>
<head>
<title>APPLICATION LIST</title>
</head>
<body>
...
http://192.168.0.2/?command=key&action=up
...
</body>
</html>
```

FIG. 6A
FIG. 6B
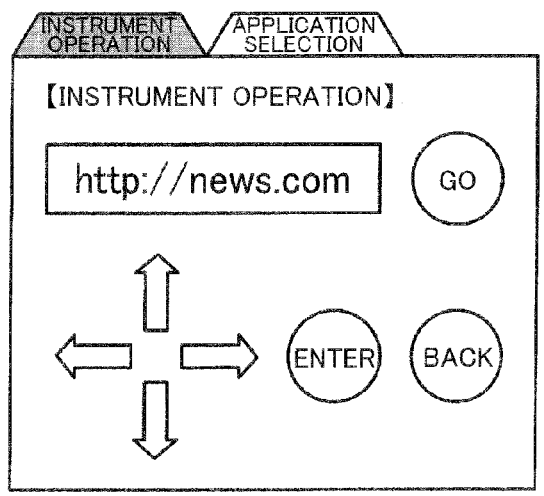
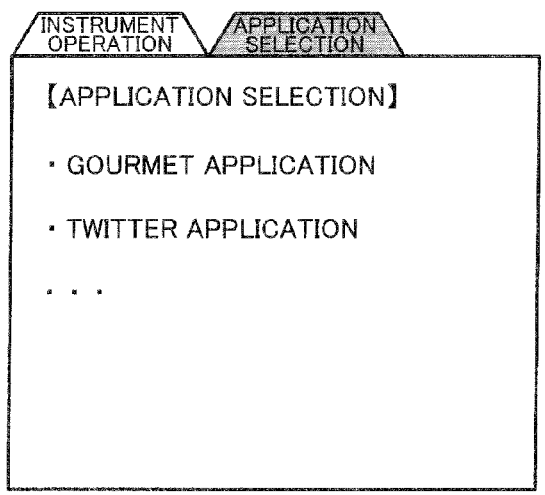

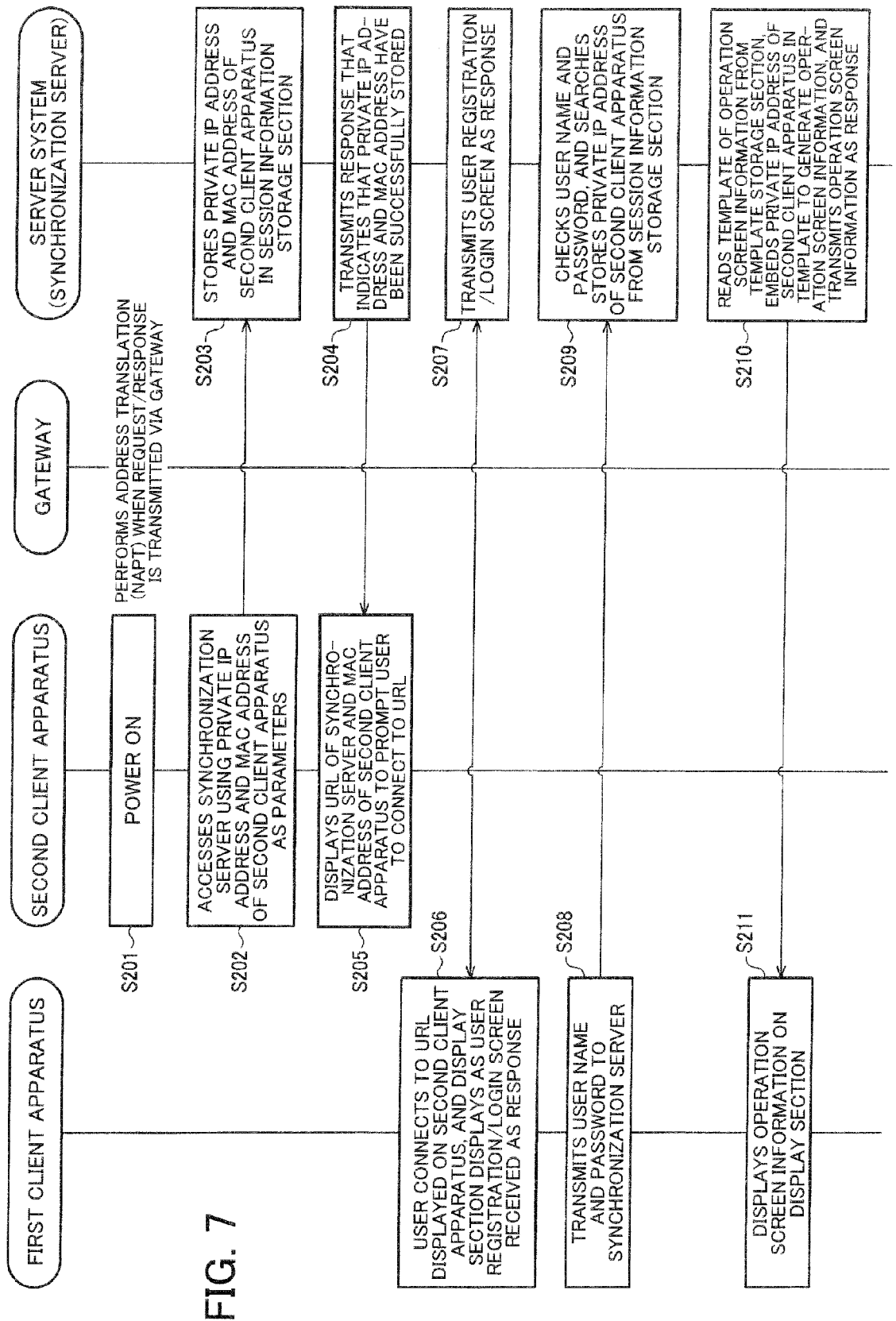

FIG. 14A

BEFORE PROCESSING

```
<html>
<head>
<title>GOURMET APPLICATION SETTING</title>
</head>
<body>
:
<script type="text/javacript">
:
http://{{ HMD_URL }}/?app=gourmet···
:
</script>
:
</body>
</html>
```

FIG. 14B

AFTER PROCESSING

```
<html>
<head>
<title>GOURMET APPLICATION SETTING</title>
</head>
<body>
:
<script type="text/javacript">
:
http://192.168.0.2/?app=gourmet···
:
</script>
:
</body>
</html>
```

FIG. 15

```
UPDATE INTERVAL
(SECONDS):              5 SECONDS
SORTING        ●NEAR ○POPULAR

NO-SMOKING ZONE   ☐AVAILABLE

SEARCH
```

FIG. 16A

BEFORE PROCESSING

```
<html>
<head>
<title>GOURMET APPLICATION</title>
</head>
<body>
...
<script type="text/javascript">
...
setInterval(function() { //PERFORMS PROCESS AT
DISPLAY INTERVALS
    ...
    ...'sort' : '{{ SORT }}',
    ...'nosmoking' : '{{ NOSMOKING }}',
    ...'latitude' : '{{ LATITUDE }}',
    ...'longitude' : '{{ LONGITUDE }}',
    ...
}
,{{ INTERVAL }});
...
</script>
</body>
</html>
```

FIG. 16B

AFTER PROCESSING

```
<html>
<head>
<title>GOURMET APPLICATION</title>
</head>
<body>
...
<script type="text/javascript">
...
setInterval(function() { //PERFORMS PROCESS AT
DISPLAY INTERVALS
    ...
    ...'sort' : 'near',
    ...'nosmoking' : 'yes',
    ...'latitude' : '39',
    ...'longitude' : '120',
    ...
}
,5000);
...
</script>
</body>
</html>
```

|  | NAME | LATI-TUDE | LONGI-TUDE | ADDRESS | IMAGE (URL) |
|---|---|---|---|---|---|
| DATA 1 | ITALIAN RESTAURANT | 35.6995 | 139.411 | ...,CHUO-KU, TOKYO | http://gourmet.co.jp/img/1.jpg |
| DATA 2 | FRENCH RESTAURANT | 35.6442 | 139.392 | ...,MINATO-KU, TOKYO | http://gourmet.co.jp/img/2.jpg |
| ⋮ | ⋮ | ⋮ | ⋮ | ⋮ | ⋮ |

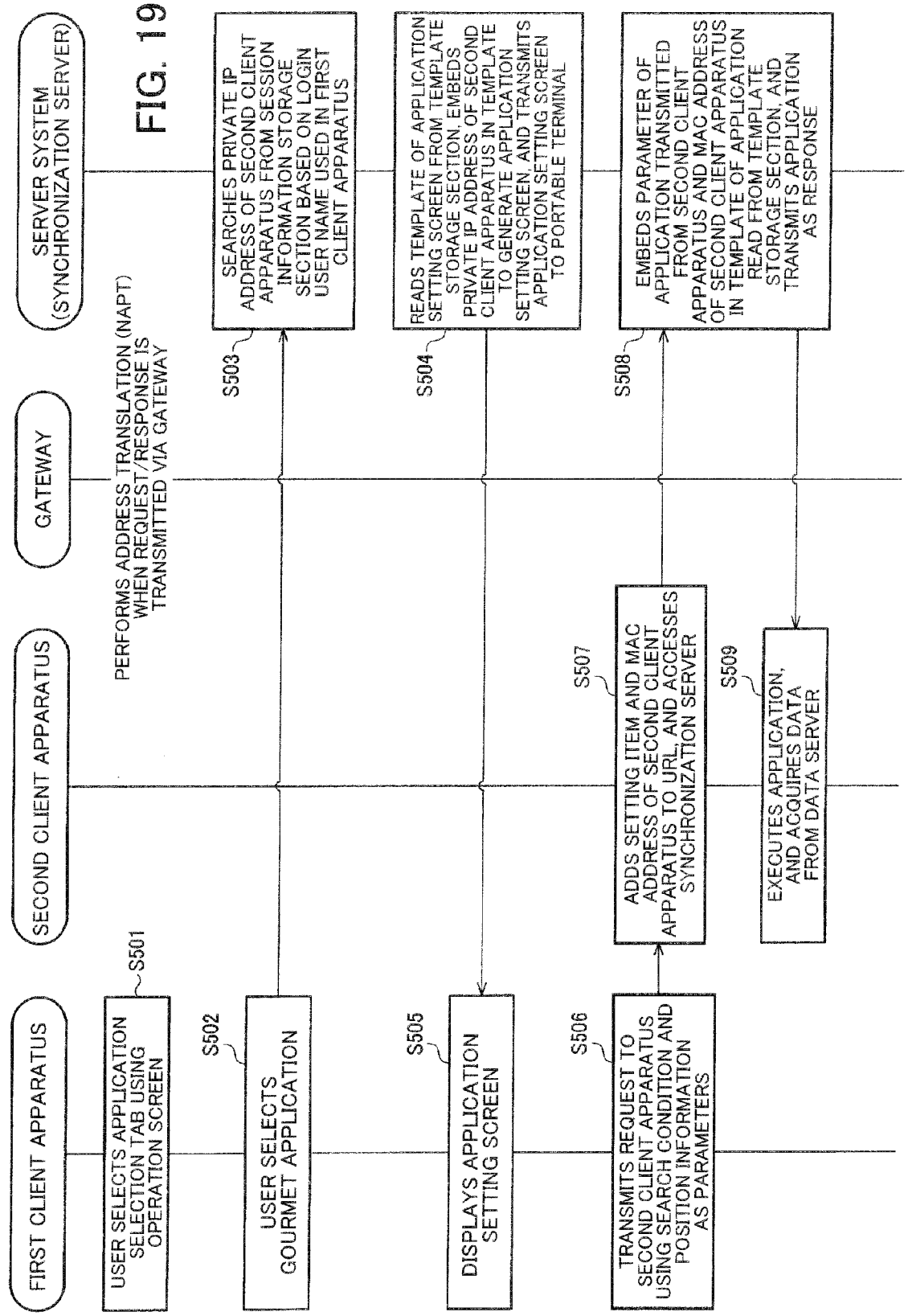

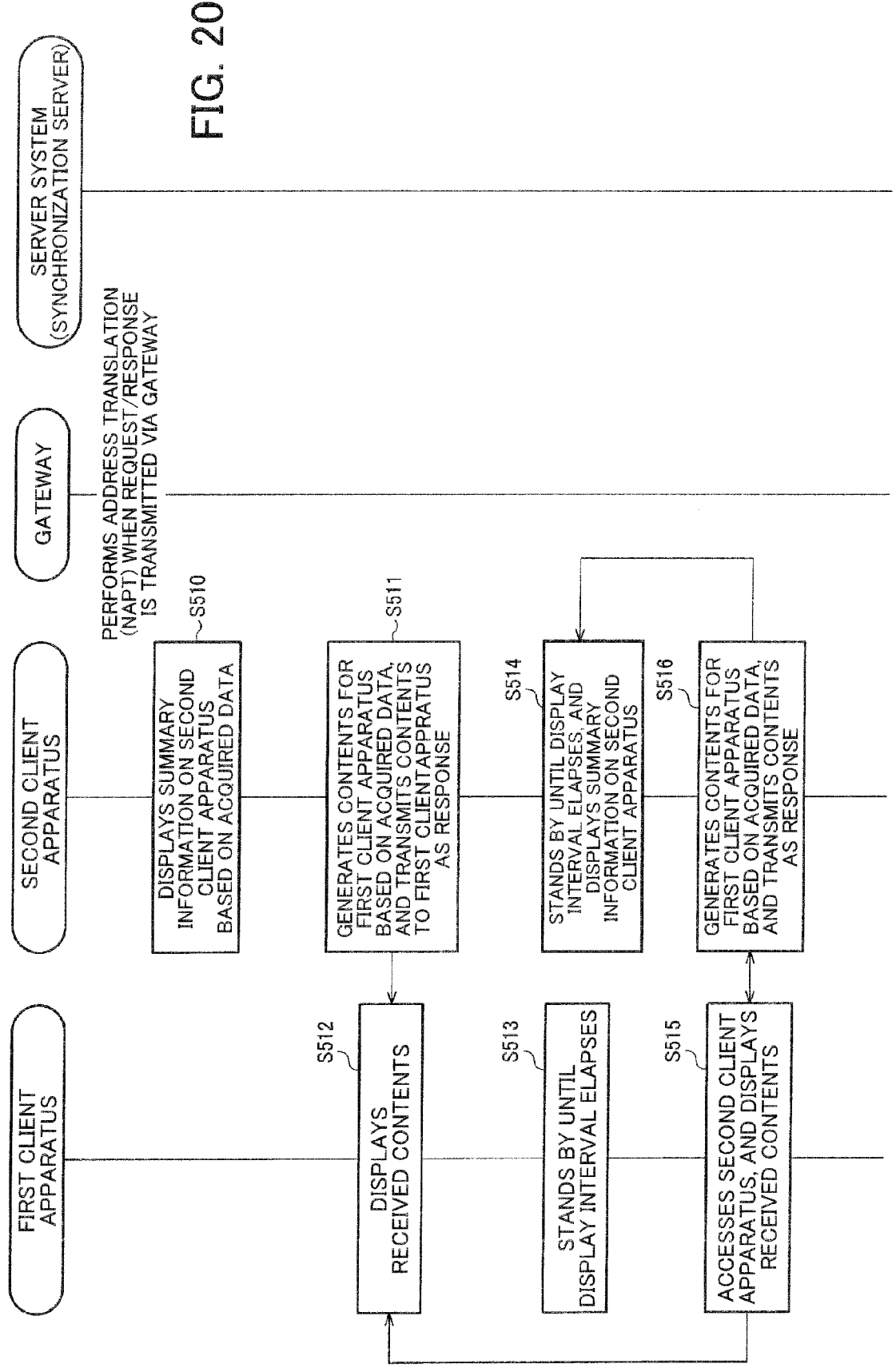

SERVER SYSTEM AND METHOD OF CONTROLLING CLIENT APPARATUS

Japanese Patent Application No. 2011-041315 filed on Feb. 28, 2011, is hereby incorporated by reference in its entirety.

BACKGROUND

The present invention relates to a server system, a method of controlling a client apparatus, and the like.

In recent years, various instruments have been used as a client apparatus (particularly a client apparatus used in a mobile environment). A head-mounted display (HMD) that may be used as such a client apparatus has a simple operation section (e.g., operation button), and may not allow the user to perform a complex operation. Specifically, since the HMD is mounted on the head of the user, the size and the shape of the HMD are necessarily limited.

A mobile phone or the like has been widely used as a client apparatus used in a mobile environment. A mobile phone or the like can acquire various contents via a network, but has an insufficient display capability since the size of the display section (display) is limited.

SUMMARY

According to one aspect of the invention, there is provided a server system comprising:

a session information storage section that stores session information, the session information being information that links identification information about a first client apparatus and identification information about a second client apparatus;

a processing section that generates operation screen information, the operation screen information being information for displaying an operation screen used to operate the second client apparatus on the first client apparatus; and a communication section that transmits the operation screen information that has been generated by the processing section to the first client apparatus, the processing section linking the first client apparatus and the second client apparatus based on the identification information about the first client apparatus that has been transmitted from the first client apparatus and the session information stored in the session information storage section, and generating the operation screen information based on a link result.

According to another aspect of the invention, there is provided a method of controlling a client apparatus comprising:

storing session information in a session information storage section, the session information being information that links identification information about a first client apparatus and identification information about a second client apparatus;

linking the first client apparatus and the second client apparatus based on the identification information about the first client apparatus that has been transmitted from the first client apparatus, and the session information stored in the session information storage section;

generating operation screen information based on a link result, the operation screen information being information for displaying an operation screen used to operate the second client apparatus on the first client apparatus; and transmitting the generated operation screen information to the first client apparatus.

BRIEF DESCRIPTION OF THE DRAWINGS

FIGS. 5A and 5B show an example in which operation screen information is generated using a template.

FIG. 6A shows an example of an instrument operation screen, and FIG. 6B shows an example of an application selection operation screen.

FIG. 7 is a flowchart illustrating a login process.

FIGS. 14A and 14B show another example in which operation screen information is generated using a template.

FIG. 15 shows an example of an application setting operation screen.

FIGS. 16A and 16B show an example in which application execution information is generated using a template.

FIG. 19 is a flowchart illustrating a linked screen display process according to a third embodiment.

FIG. 20 is a flowchart illustrating a linked screen display process according to the third embodiment.

DESCRIPTION OF EXEMPLARY EMBODIMENTS

Figure 1:
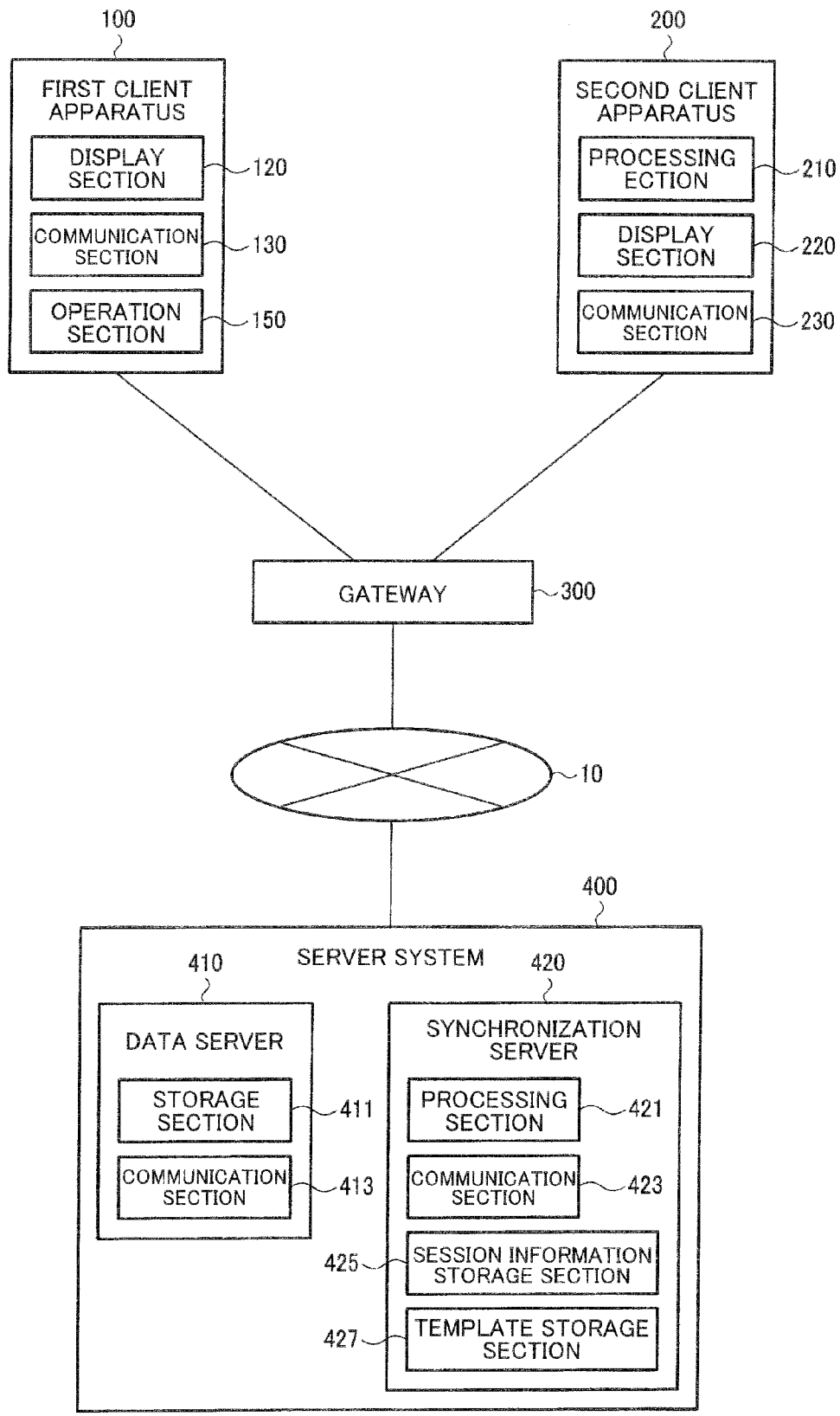
FIG. 1 shows a system configuration example according to a first embodiment.

JP-A-10-233772 discloses technology that transmits an HTML document or the like to each terminal connected to a network (e.g., corporate network) via multi-address transmission so that the data can be shared.

JP-A-2000-122957 discloses technology that displays data on a plurality of client terminals in a linked manner.

When causing a plurality of client apparatuses to operate in cooperation (in a linked manner), the update operation and the like become complex when each client apparatus manages an application executed by the client apparatus. Therefore, it is desirable to separately provide a system that links each client apparatus, and appropriately manage an application and contents.

Several aspects of the invention may provide a server system and the like that causes a plurality of client apparatuses to operate in cooperation (in a linked manner) by linking a plurality of client apparatuses, and performing image information management and the like based on the link result.

According to one embodiment of the invention, there is provided a server system comprising:

a session information storage section that stores session information, the session information being information that links identification information about a first client apparatus and identification information about a second client apparatus;

a processing section that generates operation screen information, the operation screen information being information for displaying an operation screen used to operate the second client apparatus on the first client apparatus; and a communication section that transmits the operation screen information that has been generated by the processing section to the first client apparatus, the processing section linking the first client apparatus and the second client apparatus based on the identification information about the first client apparatus that has been transmitted from the first client apparatus and the session information stored in the session information storage section, and generating the operation screen information based on a link result.

The server system links the client apparatuses based on the session information, and generates the operation screen information. This makes it possible to cause a plurality of client apparatuses to operate in cooperation (in a linked manner) based on the link result.

In the server system, the operation screen information may include application setting operation screen information for setting an application that is executed by the second client apparatus, the first client apparatus may transmit a parameter for executing the application that has been set using an application setting operation screen displayed based on the application setting operation screen information to the second client apparatus, the second client apparatus may transmit an identification information-added parameter to the server system, the identification information-added parameter being information obtained by adding the identification information about the second client apparatus to the parameter that has been received from the first client apparatus, and the processing section may generate application execution information based on the identification information-added parameter that has been received from the second client apparatus, the application execution information being information for the second client apparatus to execute the application.

This makes it possible to reflect the setting performed using the first client apparatus in the application executed by the second client apparatus, for example.

In the server system, the second client apparatus may acquire data by executing the application based on the application execution information, and may generate display data for the second client apparatus and display data for the first client apparatus based on the acquired data, the display data for the first client apparatus being data that relates to the display data for the second client apparatus, and the communication section may receive the display data for the first client apparatus that has been generated by the second client apparatus and the identification information about the second client apparatus.

This makes it possible to appropriately store the display data for the first client apparatus generated by the second client apparatus in a linked manner, for example.

In the server system, the processing section may link the first client apparatus and the second client apparatus based on the identification information about the first client apparatus and the session information when a contents information request command has been received from the first client apparatus, and may determine whether or not the display data for the first client apparatus that has been generated by the second client apparatus is response data that corresponds to the contents information request command based on a link result, and the communication section may transmit the display data for the first client apparatus to the first client apparatus that has transmitted the contents information request command when it has been determined that the display data for the first client apparatus is the response data that corresponds to the contents information request command.

This makes it possible to display related data on the first client apparatus and the second client apparatus, for example.

In the server system, the operation screen information may include instrument operation screen information for operating the second client apparatus, and application selection operation screen information for selecting the application that is executed by the second client apparatus, the processing section may generate the instrument operation screen information and the application selection operation screen information that correspond to the second client apparatus when the session information has been initially registered, or the first client apparatus and the second client apparatus have been linked based on the session information, and the communication section may transmit the instrument operation screen information and the application selection operation screen information that have been generated by the processing section to the first client apparatus.

This makes it possible to display the operation screen on the first client apparatus when the first client apparatus and the second client apparatus have been linked based on the session information, for example.

In the server system, the first client apparatus may generate an application selection command based on an operation input performed using an application selection operation screen that is displayed based on the application selection operation screen information, the communication section may receive the application selection command from the first client apparatus, the processing section may link the first client apparatus and the second client apparatus based on the session information, and may generate application setting operation screen information used for setting the application that has been selected corresponding to the application selection command when the application is executed by the second client apparatus that has been linked to the first client apparatus, and the communication section may transmit the application setting operation screen information generated by the processing section to the first client apparatus.

This makes it possible to select the application executed by the second client apparatus based on an operation performed using the first client apparatus, and display the setting screen on the first client apparatus, for example.

In the server system, the first client apparatus may set at least one of address information about the second client apparatus, execution target application type information, and execution condition information about the application as the parameter, and the processing section may generate the application execution information based on the parameter that has been set by the first client apparatus.

This makes it possible to set various types of information as the parameter.

In the server system, the communication section may receive address information and instrument information about the second client apparatus from the second client apparatus as the identification information upon startup of the second client apparatus, and the session information storage section may store the address information and the instrument information about the second client apparatus as the session information.

This makes it possible to store the address information and the instrument information about the second client apparatus as the session information.

In the server system, the communication section may receive the identification information about the first client apparatus and the instrument information about the second client apparatus from the first client apparatus, and the session information storage section may store the identification information about the first client apparatus as the session information so that the identification information about the first client apparatus is linked to the address information and the instrument information about the second client apparatus.

This makes it possible to compare the identification information about the first client apparatus with the identification information about the second client apparatus, and store the identification information about the first client apparatus as the session information.

The server system may further comprise:

a template storage section that stores a template of contents information that is displayed on at least one of the first client apparatus and the second client apparatus, and a template of application execution information about an application that is executed by the second client apparatus, the processing section may generate at least one of the contents information and the application execution information based on the template.

The contents information generation process or the application generation process can be simplified by utilizing the template, for example.

In the server system, the processing section may embed address information about the second client apparatus in a template of the operation screen information stored in the template storage section to generate the operation screen information as the contents information.

The operation screen information generation process can be simplified by utilizing the template, for example.

In the server system, the processing section may embed a parameter that has been set using an application setting operation screen and the identification information about the second client apparatus in the template of the application execution information stored in the template storage section to generate the application execution information.

The application execution information generation process can be simplified by utilizing the template, for example.

In the server system, the second client apparatus may display address information about the server system and the identification information about the second client apparatus on a display section of the second client apparatus, the first client apparatus may transmit the identification information about the first client apparatus and the identification information about the second client apparatus to the server system using a web browser based on information displayed on the display section of the second client apparatus, the communication section may receive the identification information about the first client apparatus and the identification information about the second client apparatus, and the session information storage section may store the identification information about the first client apparatus as the session information so that the identification information about the first client apparatus is linked to the identification information about the second client apparatus.

This makes it possible to implement the above process even when the first client apparatus utilizes a web browser.

According to another embodiment of the invention, there is provided a method of controlling a client apparatus comprising:

storing session information in a session information storage section, the session information being information that links identification information about a first client apparatus and identification information about a second client apparatus;

linking the first client apparatus and the second client apparatus based on the identification information about the first client apparatus that has been transmitted from the first client apparatus, and the session information stored in the session information storage section;

generating operation screen information based on a link result, the operation screen information being information for displaying an operation screen used to operate the second client apparatus on the first client apparatus; and transmitting the generated operation screen information to the first client apparatus.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Method

Methods according to several embodiments of the invention are described below. In recent years, a mobile device (client apparatus) such as a mobile phone has been widely used. The client apparatus includes a display section, a communication section, and the like. The client apparatus can acquire contents via a network, and display the contents on the display section, for example.

Since the client apparatus is a mobile device, the client apparatus is normally limited in size, and has a small display section. A head-mounted display or the like that may be used as the client apparatus has a simple operation section (e.g., operation button), and may not allow the user to perform a complex operation. Specifically, since the head-mounted display is mounted on the head of the user, the shape and the size of the head-mounted display are necessarily limited.

The above problem may be solved by causing a plurality of client apparatuses within the same LAN environment to operate in cooperation (in a linked manner) taking account of the fact that a plurality of client apparatuses may be provided in the same LAN environment along with increasing use of mobile routers and mobile phones that can implement tethering, for example. Specifically, when a first client apparatus and a second client apparatus are present, and the second client apparatus executes a given application, an application operation screen is displayed on the display section of the first client apparatus. The second client apparatus executes the application based on an operation performed using the operation screen displayed on the display section of the first client apparatus.

This makes it possible to operate the second client apparatus using the first client apparatus, for example. This is particularly effective when the second client apparatus is a terminal that is provided with only a simple operation section (e.g., head-mounted display).

When the second client apparatus acquires contents by executing the application, the second client apparatus may allocate the acquired contents to the first client apparatus and the second client apparatus so that the contents are displayed on the display section of each client apparatus.

This makes it possible to display a plurality of screens in a linked manner using a plurality of display sections. This is particularly effective when the client apparatus is a mobile device that is provided with a small display section.

A system that utilizes a synchronization server that links the first client apparatus and the second client apparatus when the first client apparatus and the second client apparatus operate in cooperation (in a linked manner) is proposed herein. The synchronization server accepts access from the first client apparatus and the second client apparatus, and stores the identification information about each client apparatus as session information to link the first client apparatus and the second client apparatus.

This makes it unnecessary for the first client apparatus to determine the address information (e.g., IP address) about the second client apparatus. The first client apparatus receives information including the address information about the second client apparatus from the synchronization server, and accesses the second client apparatus by utilizing the received information. The IP address of each client apparatus is likely to be changed by DHCP in an environment in which a mobile router or the like is used. Therefore, it is very advantageous to make it unnecessary for the first client apparatus to determine the address information about the second client apparatus. Moreover, the application executed by the second client apparatus can be stored in the synchronization server. The application update operation and the like can be facilitated by storing the application in the synchronization server as compared with the case where each client apparatus independently stores the application.

A first embodiment, a second embodiment, and a third embodiment of the invention are described below. The first embodiment illustrates a method that utilizes the first client apparatus as the operation section (remote controller) of the second client apparatus. The second embodiment illustrates a method that displays a plurality of screens in a linked manner using the display section of the first client apparatus and the display section of the second client apparatus based on data acquired from a server system (data server) taking a gourmet application (restaurant search application) as an example. In particular, the second embodiment illustrates an example in which display data for the first client apparatus and display data for the second client are exchanged via a synchronization server. The third embodiment illustrates an example in which the first client apparatus and the second client apparatus directly communicate with each other, and acquire the display data for the first client apparatus and the display data for the second client apparatus as a modification of the second embodiment.

2. First Embodiment

A method that utilizes a first client apparatus as an operation section (remote controller) of a second client apparatus is described below. A system configuration example will be described first, and the details of a process will then be described using a flowchart.

2.1 System Configuration Example

FIG. 1 shows a configuration example of a system that includes a server system 400 according to the first embodiment. The system includes a first client apparatus 100, a second client apparatus 200, a gateway 300, and the server system 400. Note that the system is not limited to the configuration shown in FIG. 1. Various modifications may be made, such as omitting some of the elements shown in FIG. 1 or adding other elements. The first client apparatus 100 and the second client apparatus 200 are possessed (owned or carried) by the user. The gateway 300 may or may not be possessed (owned or carried) by the user. The first client apparatus 100 or the second client apparatus 200 may include the gateway 300.

The first client apparatus 100 includes an operation section 150, a display section 120, and a communication section 130. The operation section 150 allows the user to perform various operations. The operation section 150 includes a touch panel, an operation key, and the like. The display section 120 displays a display image. The communication section 130 communicates with the second client apparatus 200 via the gateway 300. The communication section 130 also communicates with the server system 400 via the gateway 300 and a network 10.

The second client apparatus 200 includes a processing section 210, a display section 220, and a communication section 230. The processing section 210 performs various processes. For example, the processing section 210 executes an application according to the setting using the first client apparatus 100. The display section 220 displays a display image. The communication section 230 communicates with the first client apparatus 100 via the gateway 300. The communication section 230 also communicates with the server system 400 via the gateway 300 and the network 10.

The gateway 300 allows a plurality of terminals to be connected to the network 10 using Network Address Port Translation (NAPT) or the like. The gateway 300 may have a Dynamic Host Configuration Protocol (DHCP) server function, and may dynamically assign a private IP address to an instrument (e.g., first client apparatus 100 and second client apparatus 200) connected to the network 10.

The server system 400 includes a data server 410 and a synchronization server 420. Note that the data server 410 and the synchronization server 420 need not operate in cooperation. The data server 410 and the synchronization server 420 may be provided at remote positions, or may be functionally separated.

The data server 410 includes a storage section 411 and a communication section 413. The storage section 411 stores contents (e.g., web contents). The communication section 413 communicates with the first client apparatus 100 and the second client apparatus 200 via the network 10 and the gateway 300.

The synchronization server 420 includes a processing section 421, a communication section 423, a session information storage section 425, and a template storage section 427. The processing section 421 performs various processes. For example, the processing section 210 generates operation screen information used in the first client apparatus, or generates an application used in the second client apparatus.

The communication section 423 communicates with the first client apparatus 100 and the second client apparatus 200 via the network 10 and the gateway 300. The session information storage section 425 stores identification information about the first client apparatus 100 and identification information about the second client apparatus 200 as session information in a linked manner. The template storage section 427 stores various templates. For example, the template storage section 427 stores a template of the operation screen information and a template of an application.

2.2 Details of Process

Figure 2:
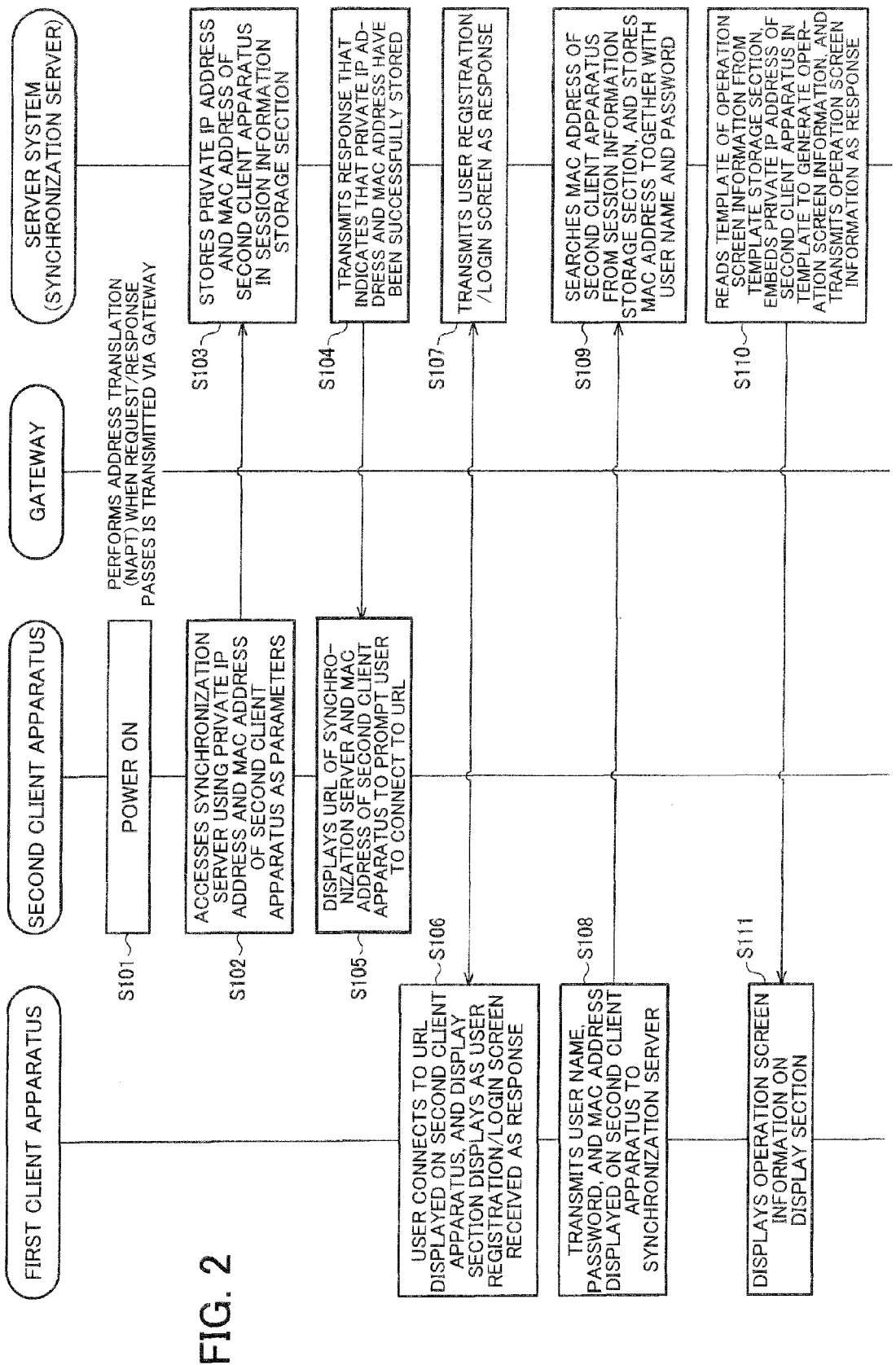
FIG. 2 is a flowchart illustrating a user registration process.

The details of a process are described below using a flowchart shown in FIG. 2. Note that the flowchart shown in FIG. 2 illustrates the flow of a process when the user who uses the first client apparatus 100 and the second client apparatus 200 has not registered himself via the synchronization server 420.

In a step S101, the second client apparatus 200 is turned ON. The second client apparatus 200 accesses the synchronization server 420 using address information (e.g., IP address) and instrument information (e.g., MAC address) about the second client apparatus 200 as parameters (S102). The URL used in the step S102 is as follows, for example.

(1) http://websync.ne.jp/?ip=192.168.0.2&mac=00:FF:1B:AA:BB:DD

Note that "websync.ne.jp" indicates the URL of the synchronization server 420, "192.168.0.2" indicates the address information about the second client apparatus 200, and "00:FF:1B:AA:BB:DD" indicates the instrument information about the second client apparatus 200. The URL of the synchronization server 420 follows a character string "http://", and the name and the value of each parameter (connected by "=") follow a character string "/?". A character "&" is written between a plurality of parameters. The IP address of the second client apparatus 200 is input as the value of the parameter "ip", and the MAC address of the second client apparatus 200 is input as the value of parameter "mac".

The synchronization server 420 stores the address information and the instrument information about the second client apparatus 200 received from the second client apparatus 200 in the session information storage section 425 (S103). When the address information and the instrument information about the second client apparatus 200 have been successfully stored, the synchronization server 420 transmits a response that indicates to that effect to the second client apparatus 200 (S104).

Figures 3, 4:
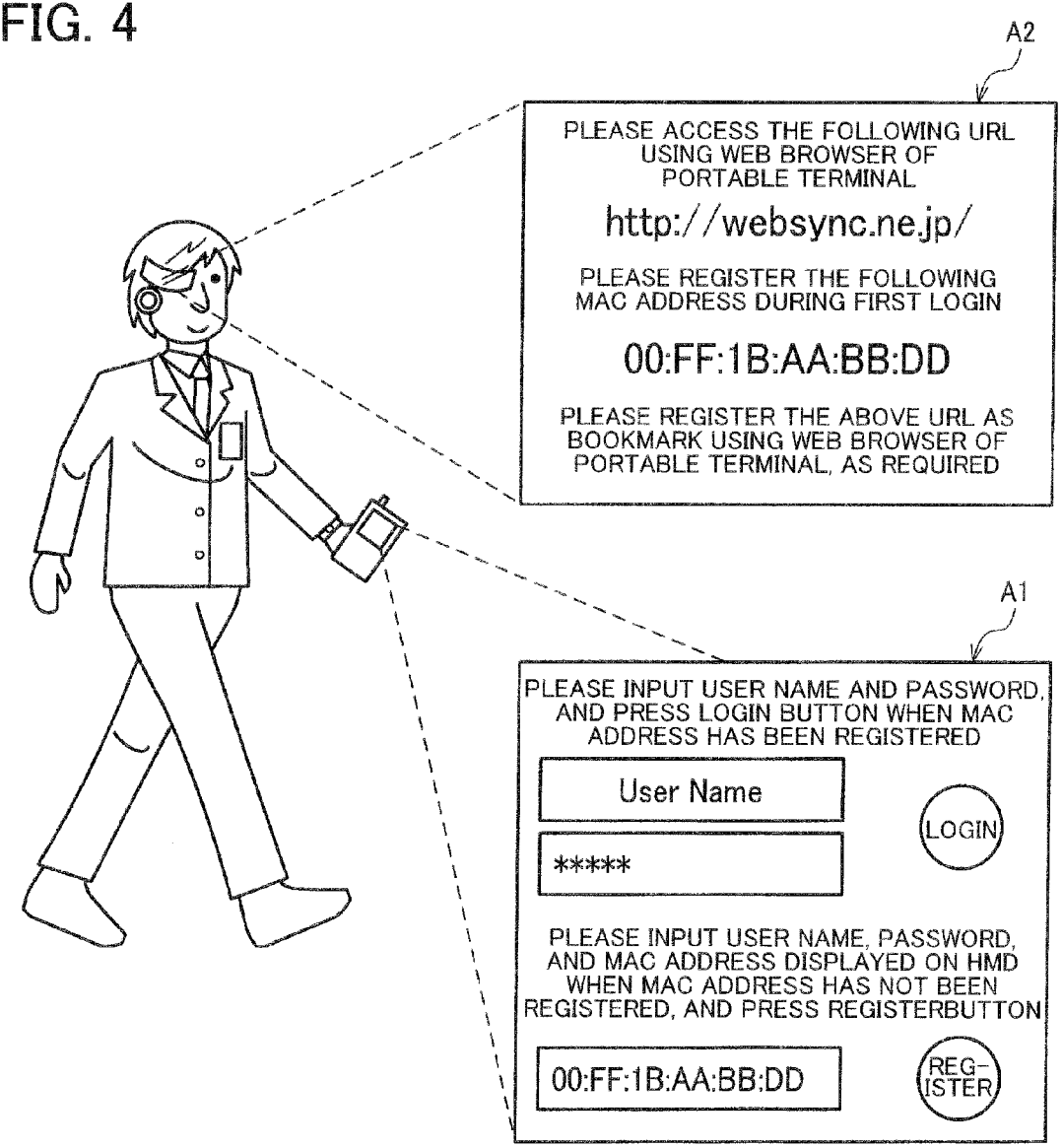
FIG. 3 shows an example of the data structure of session information stored in a session information storage section.
FIG. 4 shows an example of an image displayed on a display section of a first client apparatus and an example of an image displayed on a display section of a second client apparatus.

FIG. 3 shows an example of the structure of the data stored in the session information storage section 425 in the step S103. The data shown in FIG. 3 includes the identification information (e.g., user name and password) about the first client apparatus 100, the identification information (e.g., IP address and MAC address) about the second client apparatus 200, and display data for the first client apparatus. The IP address and the MAC address of the second client apparatus 200 are stored in the step S103, and the identification information (user name and password) about the first client apparatus 100 is stored in a step S109. The display data for the first client apparatus is not used in the first embodiment. The details of the display data for the first client apparatus are described later in connection with the second embodiment. Note that the combination of the MAC address of the second client apparatus 200 and the user name must be unique. The IP address of the second client apparatus 200 may change according to DHCP. The IP address of the second client apparatus 200 is updated each time the second client apparatus 200 is turned ON and accesses the synchronization server 420 in the steps S102 and S103. The MAC address of the second client apparatus 200 is data for assigning a unique ID to the second client apparatus 200. Data (e.g., the date of access to the synchronization server 420) other than the MAC address may also be used as long as a unique ID can be assigned to the second client apparatus 200.

When the second client apparatus 200 has received the response that indicates that the synchronization server 420 has successfully stored the session information, the second client apparatus 200 displays the address information (e.g., URL) about the synchronization server 420 and the instrument information about the second client apparatus 200 on the display section 220 (S105). The first client apparatus 100 accesses the synchronization server 420 based on the information displayed on the display section 220. The synchronization server 420 transmits information about a user registration screen (that may also serve as a login screen) to the first client apparatus 100 as a response, and the user registration screen is displayed on the display section 120 of the first client apparatus 100 (S106 and S107).

FIG. 4 shows an example of the screen displayed on the second client apparatus in the step S105, and an example of the screen displayed on the first client apparatus in the step S106. FIG. 4 shows an example in which the first client apparatus is a mobile phone, and the second client apparatus is a head-mounted display. Note that the first client apparatus and the second client apparatus are not limited thereto. As shown in FIG. 4, the URL of the synchronization server 420 is displayed on the second client apparatus to prompt the user to access the synchronization server 420 using the first client apparatus. The MAC address of the second client apparatus is also displayed so that the user can input the MAC address of the second client apparatus during user registration. The user registration screen (that also serves as the login screen in FIG. 4) is displayed on the first client apparatus. The user registration screen allows the user to input the user name, the password, and the MAC address of the second client apparatus.

The first client apparatus 100 transmits the identification information (e.g., user name and password) and the instrument information about the second client apparatus 200 that is displayed on the display section 220 to the synchronization server 420 based on the user registration screen displayed on the display section 120 (S108). The synchronization server 420 compares the instrument information about the second client apparatus stored in the step S103 with the instrument information about the second client apparatus transmitted in the step S108, and stores the identification information (user name and password) about the first client apparatus in the session information storage section 425 together with the instrument information about the second client apparatus (S109). The data format has been described above with reference to FIG. 3.

When the synchronization server 420 has stored the session information, the synchronization server 420 reads the template of the operation screen information from the template storage section 427, embeds the address information about the second client apparatus 200 in the template to generate the operation screen information, and transmits the operation screen information to the first client apparatus 100 (S110). The operation screen information is instrument operation screen information for operating the second client apparatus 200 that is used in the first client apparatus 100, or application selection operation screen information for selecting an application executed by the second client apparatus 200. The first client apparatus 100 receives the operation screen information, and displays an operation screen on the display section 120 based on the received operation screen information (S111).

The instrument operation screen information or the application selection operation screen information is generated in the step S110 by performing an embedding process on the template stored in the template storage section 427. FIGS. 5A and 5B show a specific example of the template and the embedding process. An HTML document shown in FIG. 5A that is used as the template includes a tag "{{HMD_URL}}". The operation screen information (FIG. 5B) is generated by replacing the tag with the URL (IP address) of the second client apparatus 200.

FIGS. 6A and 6B show an example of the operation screen displayed in the step S111. FIG. 6A shows an operation screen that corresponds to the instrument operation screen information, and FIG. 6B shows an operation screen that corresponds to the application selection operation screen information. The screen shown in FIG. 6A or the screen shown in FIG. 6B is selected using a tab. Note that the configuration is not limited thereto. For example, the screen shown in FIG. 6A and the screen shown in FIG. 6B may be displayed at the same time.

The flow of the user registration process has been described above. The flow of a login process performed when the user registration process has been completed is described below with reference to FIG. 7.

Note that steps S201 to S207 shown in FIG. 7 are respectively the same as the steps S101 to S107, and detailed description thereof is omitted. Note that the step S201 is the same as the step S107 when the user registration screen can also be used as the login screen. Although it is unnecessary to input the MAC address of the second client apparatus 200 during the login process, the MAC address may be displayed in the step S205.

When the user registration process has been completed when the first client apparatus 100 accesses the synchronization server 420 in a step S208, the user name and the password are transmitted to the synchronization server 420. The synchronization server 420 compares the session information stored in the session information storage section 425 with the user name and the password that have been acquired from the first client apparatus 100, and links the first client apparatus 100 and the second client apparatus 200. The synchronization server 420 generates the operation screen information by embedding the address information about the second client apparatus 200 in the template of the operation screen information, and transmits the operation screen information to the first client apparatus 100 (S210). The operation screen information received in the step S211 is the same as the operation screen information received in the step S111. The operation screen is displayed based on the instrument operation screen information or the application selection operation screen information (see FIGS. 6A and 6B).

The details of the user registration process and the login process have been described above with reference to FIGS. 2 and 7. When the user registration process or the login process has been performed, the session information is stored in the session information storage section 425, and the operation screen is displayed on the first client apparatus.

Figure 8:
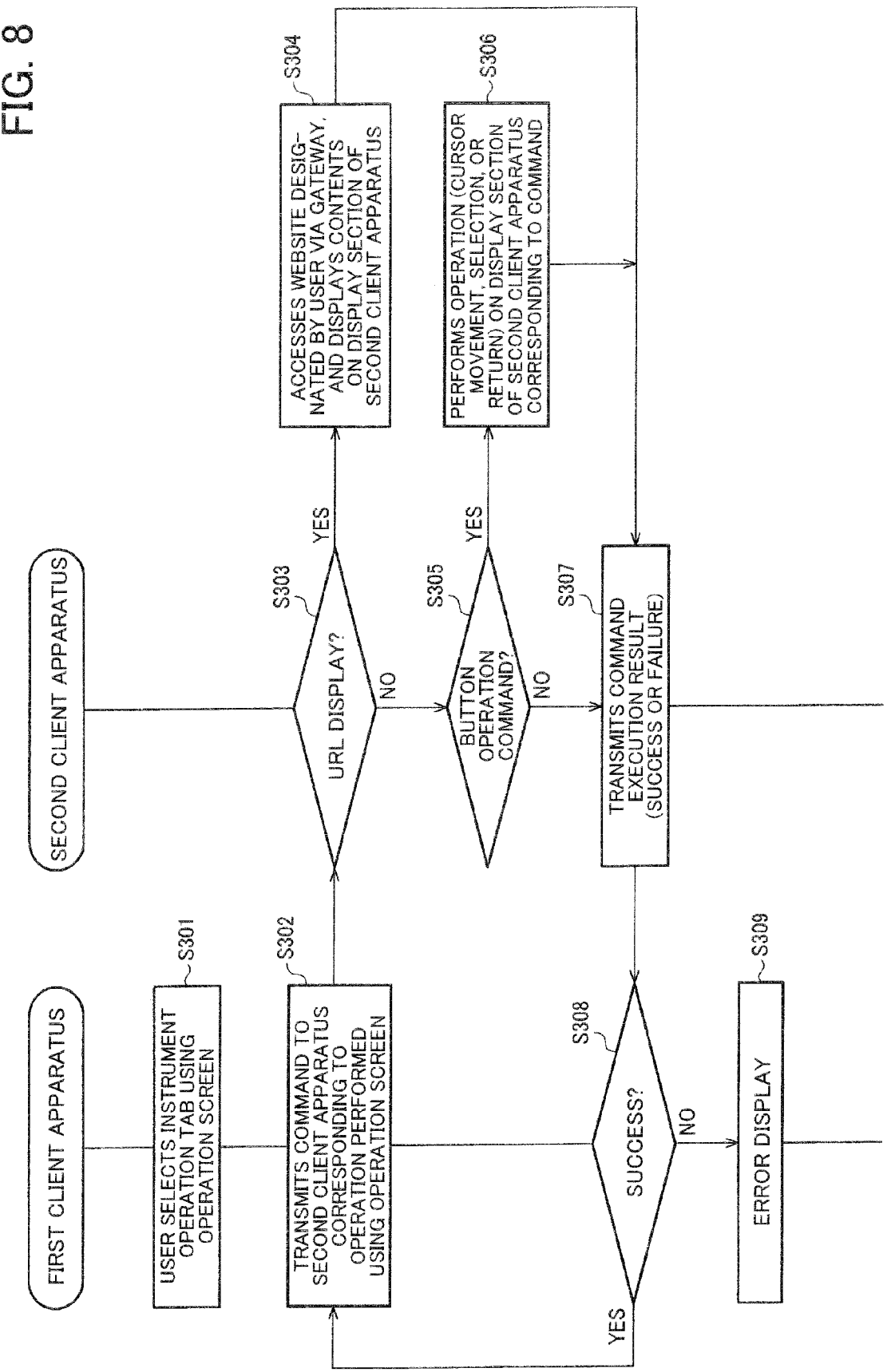
FIG. 8 is a flowchart illustrating an instrument operation process using an instrument operation screen.
Figure 9:
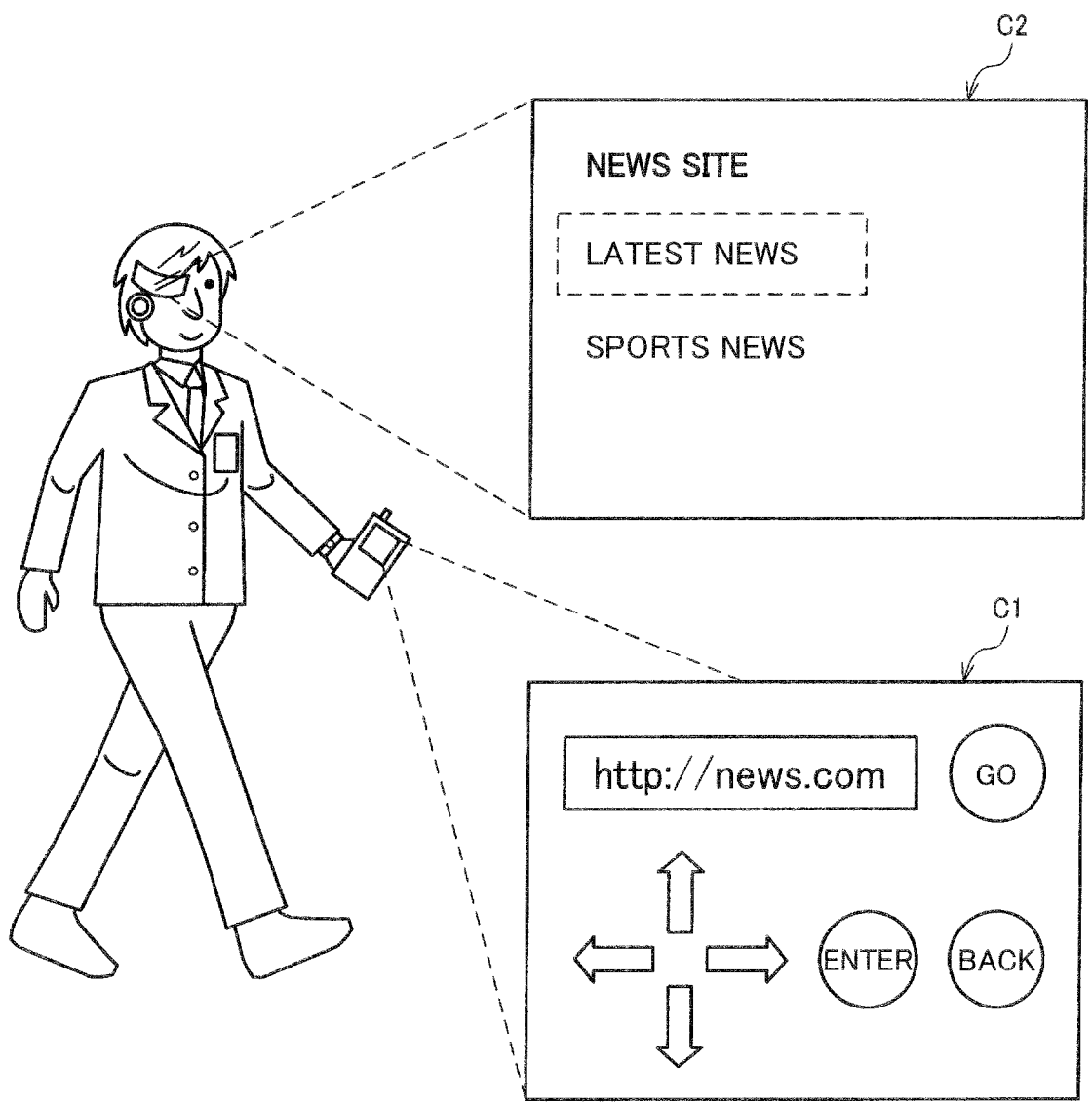
FIG. 9 shows another example of an image displayed on a display section of a first client apparatus and another example of an image displayed on a display section of a second client apparatus.

An operation performed using the instrument operation screen is described below with reference to FIG. 8. In a step S301, the instrument operation tab is selected (see FIGS. 6A and 6B), and the instrument operation screen shown in FIG. 6A is displayed on the first client apparatus 100. FIG. 9 shows a specific example of the instrument operation screen, and a specific example of the screen displayed on the second client apparatus 200 that is operated using the instrument operation screen.

A text input area, a GO button, an arrow key, an ENTER button, a BACK button, and the like are displayed on the display section 120 of the first client apparatus 100 (see C1 in FIG. 9). When the user has input the URL of the desired site in the text input area, and pressed the GO button, the corresponding contents are displayed on the display section 220 of the second client apparatus 200 (see C2 in FIG. 9). The user can go to another page or select a link in the contents by pressing the arrow key in a state in which the contents are displayed on the display section 220. The broken line (see C2) shown in FIG. 9 indicates an example in which a link in the contents is selected. When the user has pressed the ENTER button in a state in which the link is selected, the link destination page is displayed. When the user has pressed the BACK button, the previous page (display screen) is displayed.

When the instrument operation screen has been displayed on the display section 120, the first client apparatus 100 transmits a command to the second client apparatus 200 based on an operation performed using the instrument operation screen (S302). Specific examples of the command transmitted to the second client apparatus 200 are shown below.

(2)  http://192.168.0.2/?command=open&url=http://news.com (3) http://192.168.0.2/?command=key&action=up These commands are written in the form of a URL, and are transmitted as a Hypertext Transfer Protocol (HTTP) request or the like. In the command (2), the value of the parameter "command" is set to "open", and the value of the parameter "url" is set to "http://news.com". The information (command (2)) is transmitted to the terminal that corresponds to the IP address "192.168.0.2". For example, the command (2) is transmitted to the second client apparatus 200 when the user has input "http://news.com" in the text input area, and pressed the GO button.

In the command (3), the value of the parameter "command" is set to "key", and the value of the parameter "action" is set to "up". For example, the command (3) is transmitted to the second client apparatus 200 when the user has pressed the UP button (arrow key). When the value of the parameter "command" is set to "key" (i.e., key operation command), a command that corresponds to another key operation can be transmitted by changing the value of the parameter "action". For example, when the value of the parameter "action" is set to "down", "left", or "right", the command is transmitted when the user has pressed the DOWN, LEFT, or RIGHT button (arrow key). When the value of the parameter "action" is set to "enter" or "back", the command is transmitted when the user has pressed the ENTER button or the BACK button.

When the second client apparatus 200 has received the command, the second client apparatus 200 determines whether or not the received command is a command that opens the designated URL (S303). Specifically, the second client apparatus 200 checks the value of the parameter "command" of the command. The second client apparatus 200 determines that the received command is a command that opens the designated URL when the value of the parameter "command" is set to "open", and determines that the received command is not a command that opens the designated URL when the value of the parameter "command" is not set to "open". When the second client apparatus 200 has determined that the received command is a command that opens the designated URL, the second client apparatus 200 accesses the site corresponding to the designated URI, (i.e., the URL set as the value of the parameter "url") via the gateway 300, and displays the contents on the display section 220 (S304).

When the second client apparatus 200 has determined that the received command is not a command that opens the designated URL in the step S303, the second client apparatus 200 determines whether or not the received command is a key operation command (S305). Specifically, the second client apparatus 200 checks the value of the parameter "command" of the command (HTTP request). The second client apparatus 200 determines that the received command is a key operation command when the value of the parameter "command" is set to "key", and determines that the received command is not is a key operation command when the value of the parameter "command" is not set to "key". When the second client apparatus 200 has determined that the received command is a key operation command, the second client apparatus 200 performs a page change process, a link selection process, a link destination page display process, or a previous page display process corresponding to the command (i.e., the value of the parameter "action") (S306). When the second client apparatus 200 has determined that the received command is not a key operation command in the step S305, or has completed the steps S304 and S306, the second client apparatus 200 transmits the command execution result (success or failure) to the first client apparatus 100 (S307).

The first client apparatus 100 determines (checks) the received command execution result (S308). The first client apparatus 100 performs the step S302 when the received command execution result is "success", and displays an error message on the display section 120 when the received command execution result is "failure" (S309).

According to the first embodiment, the server system 400 (synchronization server 420 in a narrow sense) includes the session information storage section 425 that stores the session information, the processing section 421 that generates the operation screen information, and the communication section 423 (see FIG. 1). The session information is information that links the identification information about the first client apparatus 100 and the identification information about the second client apparatus 200. The operation screen information is information for displaying the operation screen used to operate the second client apparatus 200 on the first client apparatus 100. The processing section 421 links the first client apparatus 100 and the second client apparatus 200 based on the session information and the identification information about the first client apparatus 100 transmitted from the first client apparatus 100, and generates the operation screen information based on the link result. The communication section 423 transmits the operation screen information generated by the processing section 421 to the first client apparatus 100.

The operation screen is a screen displayed on the display section 120 of the first client apparatus 100. Specifically, the operation screen is the instrument operation screen used to operate the second client apparatus 200, the application selection operation screen used to select an application executed by the second client apparatus 200, an application setting operation screen used to set an application executed by the second client apparatus 200, or the like. The processing section 421 generates the operation screen information for displaying the operation screen. Note that the first embodiment may utilize an MIT request and an HTTP response. The term "HTTP request" used herein refers to a request that is transmitted from a web browser to a web server when a character string that starts from "http" (refer to the commands (2) and (3)) has been input to the web browser, and executed, for example. More specifically, the HTTP request includes a request line that includes a method name, the URL (e.g., a character string that starts from "http") of the target contents, and the version of HTTP, such as GET http://192.168.0.2/?command=key&action=up HTTP/1.1.

Note that HTTP specifies a POST method, a HEAD method, and the like in addition to the GET method. These methods may also be used. A header that specifies a language and a data format may be provided in addition to the request line. A body that specifies data transmitted to a server may be provided when using the POST method or the like. Note that the HTTP request need not necessarily be transmitted by the web browser. The HTTP request may be transmitted by a dedicated application that is compliant with HTTP.

It is thus possible to implement a server system that allows the first client apparatus 100 and the second client apparatus 200 to operate in cooperation (in a linked manner). More specifically, the second client apparatus 200 is operated based on an operation performed using the operation screen displayed on the display section 120 of the first client apparatus 100. In particular, when the second client apparatus 200 is a head-mounted display that is mounted on the head of the user, it is difficult to provide the second client apparatus 200 with an operation section that allows the user to perform a complex operation. Therefore, it is very useful to make it possible to operate the second client apparatus 200 (head-mounted display) using another instrument (e.g., mobile phone (first client apparatus 100)).

In the first embodiment, HTTP is used as the communication protocol. A web browser is widely known as an application that allows a client to utilize HTTP (i.e., a web browser can be utilized when using HTTP). At present, a web browser is normally provided in (or can be easily installed in) a terminal having a communication function (e.g., mobile phone). Therefore, a general-purpose terminal can be used as the client apparatus (i.e., a dedicated terminal need not be provided).

Note that the term "HTTP" used herein includes a standard (e.g., Hypertext Transfer Protocol over Secure Socket Layer (HTTPS)) developed from HTTP and a standard based on an idea (concept) similar to that of HTTP in addition to HTTP in a narrow sense. For example, HTTPS may be used when a security function is regarded as important. A message is sent using plain text when employing HTTP in a narrow sense, while an authentication process and a message encoding process are performed when employing HTTPS. Therefore, interception of communication between the client and the server can be prevented by utilizing HTTPS. In the first embodiment, the first client apparatus 100 and the second client apparatus 200 connect to the external network 10 via the gateway 300, and communicate with the server system 400 (synchronization server 420). Therefore, it is desirable to use HTTPS in order to prevent interception of communication. In particular, since the instrument identification information (e.g., user name and password) is exchanged, it is advantageous to use HTTPS from the viewpoint of security.

The operation screen information includes the instrument operation screen information and the application selection operation screen information. When the session information has been initially registered, or the first client apparatus 100 and the second client apparatus 200 have been linked based on the session information, the processing section 421 generates the instrument operation screen information and the application selection operation screen information that correspond to, the second client apparatus 200. The communication section 423 transmits the instrument operation screen information and the application selection operation screen information generated by the processing section 421 to the first client apparatus 100.

The screens shown in FIGS. 6A and 6B can thus be displayed on the display section 120 of the first client apparatus 100. Therefore, the second client apparatus 200 can be operated using the instrument operation screen shown in FIG. 6A, or an application executed by the second client apparatus 200 can be selected using the application selection operation screen shown in FIG. 6B. Note that each operation screen information generated by the processing section corresponds to the second client apparatus 200. Specifically, it is necessary to transmit information about an operation performed using the instrument operation screen to the second client apparatus 200, and applications listed (displayed) within the application selection operation screen must be applications that can be executed by the second client apparatus 200. Therefore, since the synchronization server 420 must appropriately determine the second client apparatus 200 that corresponds to the first client apparatus 100 that has accessed the synchronization server 420, the synchronization server 420 links the first client apparatus 100 and the second client apparatus 200 using the session information.

The communication section 423 of the synchronization server 420 may receive the address information and the instrument information about the second client apparatus 200 from the second client apparatus 200 as identification information upon startup of the second client apparatus 200. The session information storage section 425 may store the address information and the instrument information as the session information.

The term "address information" used herein refers to the IP address, the URL, or the like of the second client apparatus 200. The term "instrument information" used herein refers to the MAC address or the like of the second client apparatus 200.

The session information can thus be stored as shown in FIG. 3. Note that the MAC address of the second client apparatus 200 is data for assigning a unique ID to the second client apparatus 200. Data (e.g., the date of access to the synchronization server 420) other than the MAC address may also be used as long as a unique ID can be assigned to the second client apparatus 200.

The communication section 423 of the synchronization server 420 may receive the identification information about the first client apparatus 100 and the instrument information about the second client apparatus 200 from the first client apparatus 100. The session information storage section 425 may store the identification information about the first client apparatus 100 and the address information and the identification information about the second client apparatus 200 in a linked manner.

The identification information about the first client apparatus 100 refers to the user name, the password, and the like.

The session information can thus be stored as shown in FIG. 3. Since it is necessary to appropriately link the first client apparatus 100 and the second client apparatus 200 using the session information, the combination of the MAC address of the second client apparatus 200 and the user name must be unique.

As shown in FIG. 1, the synchronization server 420 includes the template storage section 427 that stores a template. The template may be a template of contents information displayed on at least one of the first client apparatus 100 and the second client apparatus 200. The template may be a template of an application executed by the second client apparatus 200. The processing section 421 of the synchronization server 420 generates at least one of the contents information and the application based on the template.

The application generation process can thus be simplified by utilizing the template.

The processing section 421 of the synchronization server 420 may embed the address information about the second client apparatus 200 in the template of the operation screen information stored in the template storage section 427 to generate the operation screen information as the contents information.

The above process has been described in detail above with reference to FIG. 5.

The operation screen information generation process can thus be simplified by utilizing the template. In the first embodiment, a plurality of client apparatuses that connected via a network (e.g., provided in the same LAN environment) operate in cooperation (in a linked manner). The second client apparatus 200 is operated using the operation screen displayed on the first client apparatus 100. Since the request (e.g., HTTP request) transmitted from the first client apparatus 100 must be transmitted to the second client apparatus 200, the address information (e.g., IP address) about the second client apparatus 200 is embedded in the template. When the system according to the first embodiment utilizes Dynamic Host Configuration Protocol (DHCP), the IP address of the second client apparatus 200 may change dynamically. The process that embeds the address information in the template is particularly effective when using DHCP. Specifically, the operation screen information can be dynamically generated corresponding to a change in the IP address of the second client apparatus 200 by embedding the IP address of the second client apparatus 200 in the template.

The second client apparatus 200 may display the address information about the server system (synchronization server 420) and the identification information about the second client apparatus 200 on the display section 220. The first client apparatus 100 may access the server system using a web browser based on the information displayed on the display section 220 of the second client apparatus 200. The first client apparatus 100 may transmit the identification information about the first client apparatus 100 and the identification information about the second client apparatus displayed on the display section 220. The communication section 423 of the synchronization server 420 may receive the identification information about the first client apparatus 100 and the identification information about the second client apparatus 200, and the session information storage section 425 may store the identification information about the first client apparatus 100 and the identification information about the second client apparatus 200 as the session information in a linked manner.

The first client apparatus 100 and the second client apparatus 200 can thus be caused to operate in cooperation (in a linked manner) when the first client apparatus 100 utilizes a web browser. A web browser cannot acquire the identification information (i.e., instrument information (e.g., MAC address)) about another terminal within the same LAN environment. Therefore, it is impossible to acquire information that indicates that the first client apparatus 100 makes a pair with the second client apparatus 200. This makes it necessary to prompt the user who operates the first client apparatus 100 to input the MAC address by displaying the identification information about the second client apparatus 200 on the display section 220 of the second client apparatus 200, for example. When the first client apparatus 100 uses dedicated software instead of a web browser, part of the above process (i.e., the step S105 in FIG. 2) can be omitted. Specifically, the MAC address of the second client apparatus can be acquired, and the URL of the synchronization server 420 can be determined by utilizing dedicated software. This makes it unnecessary to display the URL of the synchronization server 420 and the MAC address of the second client apparatus on, the display section 220 of the second client apparatus 200 (see A2 in FIG. 4).

The first embodiment also relates to a method of controlling a client apparatus including storing session information in a session information storage section, the session information being information that links identification information about a first client apparatus and identification information about a second client apparatus, linking the first client apparatus and the second client apparatus based on the identification information about the first client apparatus that has been transmitted from the first client apparatus, and the session information stored in the session information storage section, generating operation screen information based on a link result, the operation screen information being information for displaying an operation screen used to operate the second client apparatus on the first client apparatus, and transmitting the generated operation screen information to the first client apparatus.

It is thus possible to implement a method of controlling a client apparatus that can perform the above process. Note that a plurality of client apparatuses may be controlled using a server system (see above), or may be controlled using an apparatus other than a server system.

3. Second Embodiment

A method that displays a plurality of screens using the display section of a first client apparatus and the display section of a second client apparatus in a linked manner based on data acquired from a server system (data server (e.g., mashup server)) is described below taking a gourmet application (restaurant search application) as an example. A system configuration example will be described first, and the details of a process will then be described using a flowchart.

3.1 System Configuration Example

Figure 10:
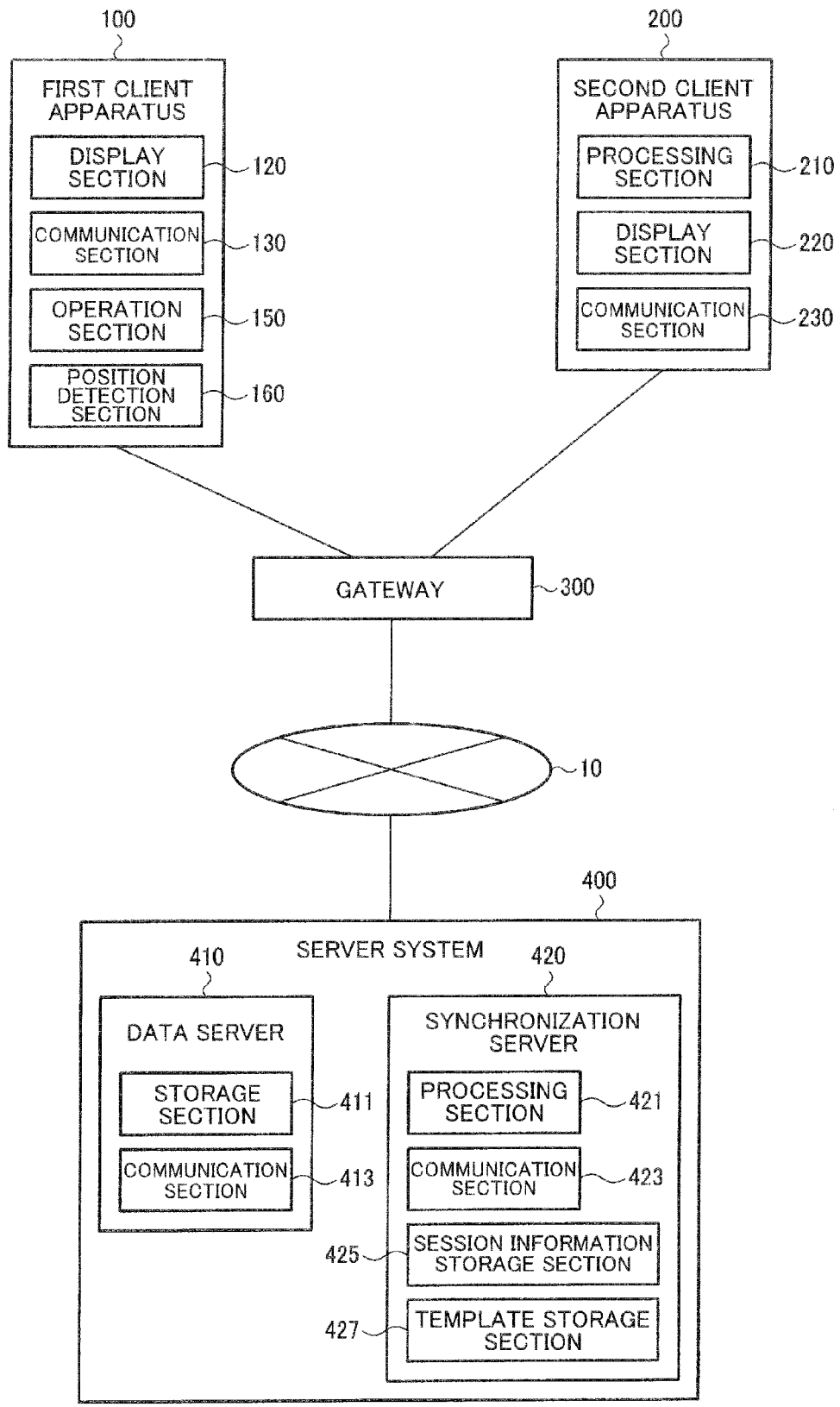
FIG. 10 shows a system configuration example according to a second embodiment.

FIG. 10 shows a configuration example of a system that includes a server system 400 according to the second embodiment. The system includes a first client apparatus 100, a second client apparatus 200, a gateway 300, and the server system 400. Note that the system is not limited to the configuration shown in FIG. 10. Various modifications may be made, such as omitting some of the elements shown in FIG. 10 or adding other elements.

The system shown in FIG. 10 differs from the system according to the first embodiment in that the first client apparatus 100 includes a position detection section 160. The position detection section 160 acquires the latitude and the longitude of the current position of the first client apparatus 100 using the GPS, WiFi, or the like. Note that the position detection section 160 is merely used for the gourmet application (i.e., application), and need not necessarily be provided.

The second embodiment also differs from the first embodiment in that a template of the operation screen information transmitted to the first client apparatus 100 and an application execution template for an application executed by the second client apparatus 200 are stored in the template storage section 427 of the synchronization server 420. The template of the operation screen information is the same as that described in connection with the first embodiment, and is used in a step S404 (described later). The application execution template is used in a step S408. The details of the application execution template are described later.

A mashup server or the like is used as the data server 410 of the server system 400 instead of a web server or the like (refer to the first embodiment).

An example of a process according to the second embodiment is described below with reference to FIG. 11. When a portable terminal (first client apparatus 100 in a broad sense) has transmitted a search condition to an HMD (second client apparatus 200 in a broad sense), the HMD transmits a data request to a mashup server (data server 410 in a broad sense), and acquires data ((1) to (3)). The HMD displays a summary on the display section, generates contents for the portable terminal, and transmits the generated contents to the portable terminal ((4) and (5)). The portable terminal displays the received contents (map information in this example) ((8)). When the contents for the portable terminal include a reference to another server (see FIG. 11), the portable terminal accesses the other server ((6) and (7)).

Figure 11:
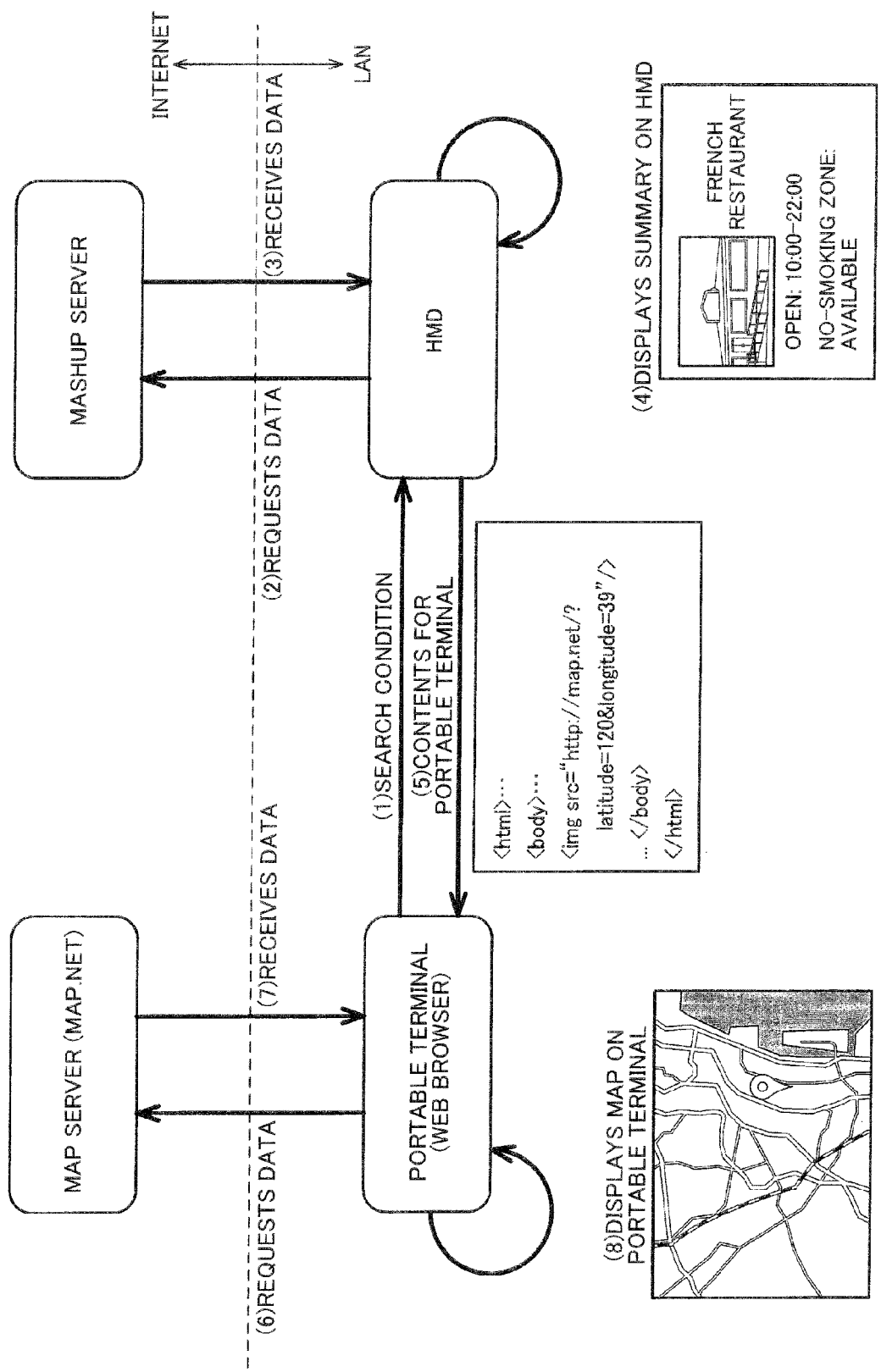
FIG. 11 is a view illustrating an example of a process according to the second embodiment.

In FIG. 11, the HMD communicates directly with the mashup server, and the portable terminal communicates directly with the map server for convenience of illustration. Note that the client apparatus and the HMD are terminals within the same LAN environment, and are connected to the network 10 via the gateway 300 (see FIG. 10). Therefore, access via the LAN and the Internet ((2) and (3) or (6) and (7)) occurs via the gateway 300 (e.g., access via the LAN and the Internet occurs after converting (translating) the address and the port number by utilizing NAPT or the like). Note also that the synchronization server 420 is omitted in FIG. 11.

3.2 Details of Process

Figure 12:
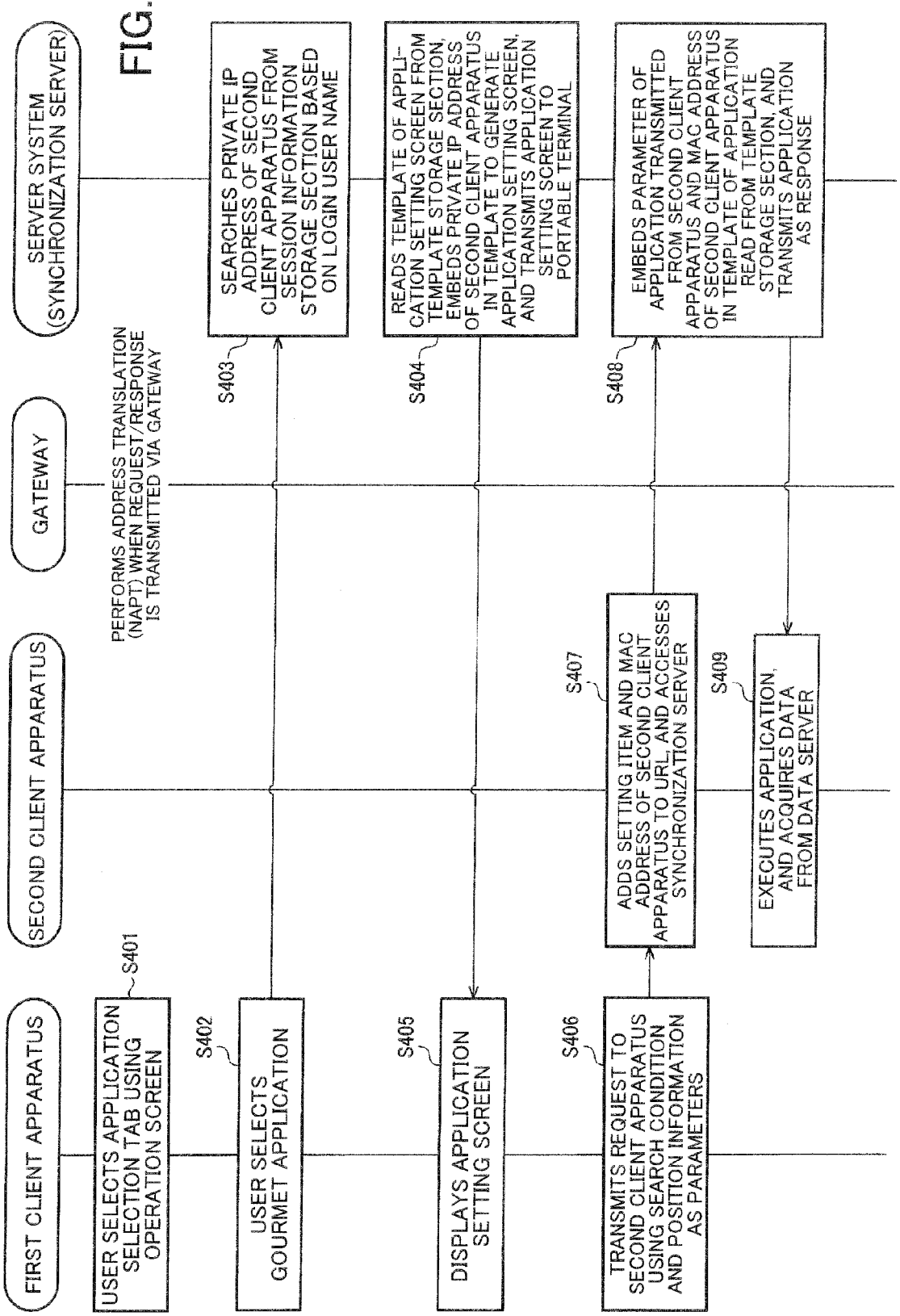
FIG. 12 is a flowchart illustrating a linked screen display process according to the second embodiment.
Figure 13:
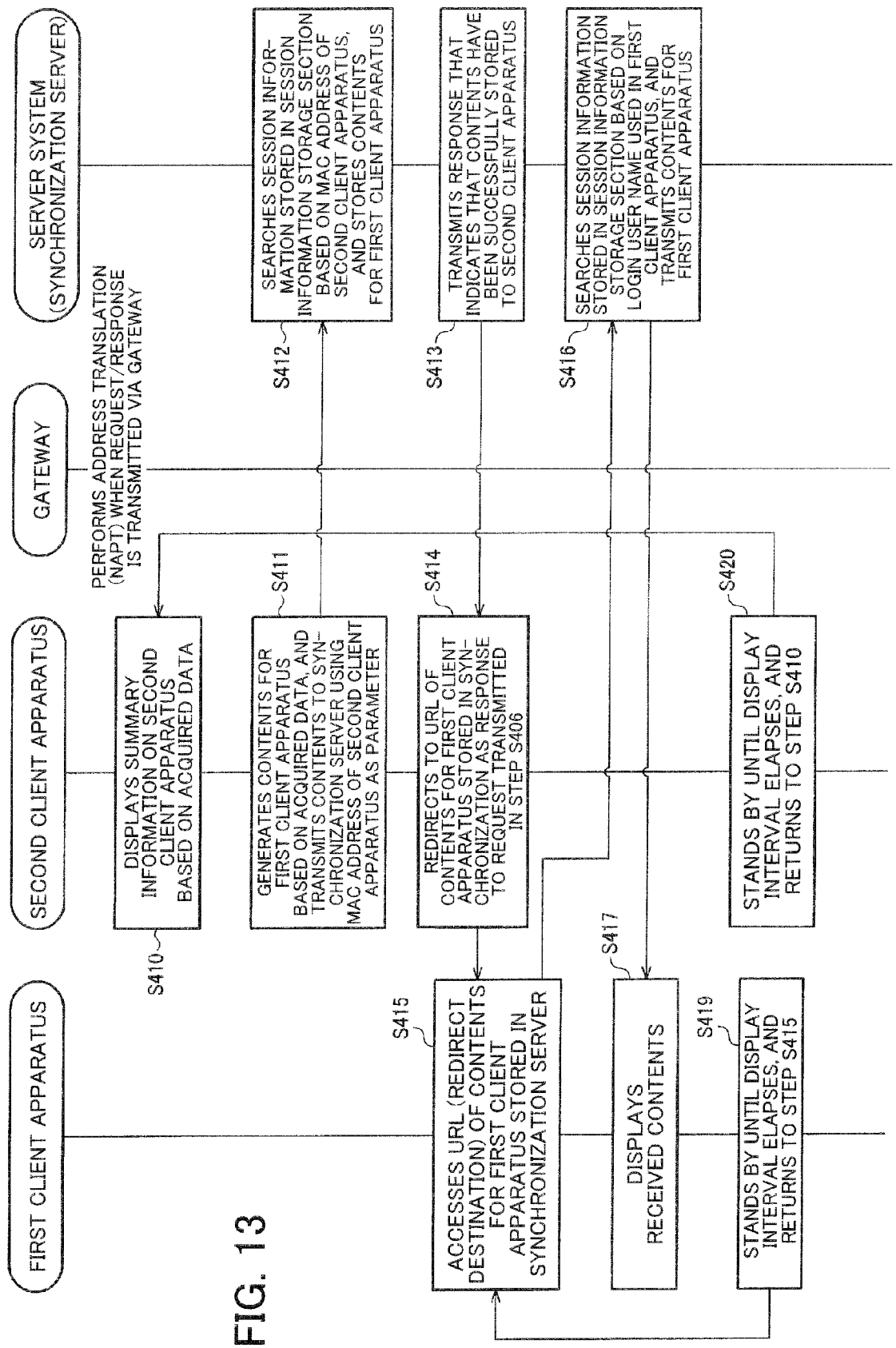
FIG. 13 is a flowchart illustrating a linked screen display process according to the second embodiment.

The details of the process are described below using a flowchart. The user registration process shown in FIG. 2 or the login process shown in FIG. 7 is performed in the same manner as in the first embodiment. A process shown in FIGS. 12 and 13 is performed after completion of the user registration process or the login process.

In a step S401, the application selection tab is selected (see FIGS. 6A and 6B), and the application selection operation screen shown in FIG. 6B is displayed on the first client apparatus 100. The desired application (gourmet application in this example) is selected from the application listed (displayed) in FIG. 6B (S402). When the application has been selected, the first client apparatus 100 accesses the synchronization server 420. The synchronization server 420 acquires the IP address of the second client apparatus 200 using the session information stored in the session information storage section 425 based on the identification information about (user name) the first client apparatus (S403). The synchronization server 420 generates the application setting operation screen information that is information for setting the application selected in the step S402 for execution by the second client apparatus. More specifically, the synchronization server 420 generates the application setting operation screen information by embedding the address information about the second client apparatus in the template of the operation screen information (particularly the application setting operation screen information) stored in the template storage section 427. The synchronization server 420 transmits the generated application setting operation screen information to the first client apparatus 100 (S404). The synchronization server 420 may transmit the application setting operation screen information in the step S404 as a response to the access from the first client apparatus when the application has been selected in the step S402. For example, the first client apparatus may transmit an HTTP request when the application has been selected in the step S402, and the synchronization server 420 may transmit the application setting operation screen information as an HTTP response.

FIGS. 14A and 14B show a specific example of the process that embeds the address information in the template. An HTML document shown in FIG. 14A that is used as the template includes a tag "{{HMD_URL}}". The application setting operation screen information (FIG. 14B) is generated by replacing the tag with the URL (IP address) of the second client apparatus 200.

The first client apparatus 100 displays the operation screen (application setting operation screen) based on the application setting operation screen information received from the synchronization server 420 (S405). FIG. 15 shows an example of the application setting operation screen displayed on the first client apparatus 100.

The first client apparatus 100 transmits the parameter (e.g., position information or application execution condition information) that has been set using the application setting operation screen to the second client apparatus 200 (S406). A specific example of the HTTP request transmitted to the second client apparatus 200 is shown below.

(4) http://192.168.0.2/?url=http://websync.ne.jp/&app=gourmet&interval=5000&nosmoking=yes&sort=near&latitude=35&longitude=120

The URL (192.168.0.2 (IP address)) of the second client apparatus 200 follows a character string "http://", and the name and the value of each parameter (connected by "=") follow a character string "/?". A character "&" is written between a plurality of parameters. The URL of the second client apparatus 200 is embedded by the template process in the step S404. The value of the parameter "url" is set to "http://websync.ne.jp"/that is the URL of the synchronization server 420.

"app", "interval", "nosmoking", "sort", "latitude", and "longitude" are set as other parameters. The parameter "app" indicates the type of the execution target application. Since the value of the parameter "app" is set to "gourmet", a gourmet application is executed. Another application can be executed by changing the value of the parameter "app". The parameter "interval" indicates the update time of the information displayed on the display section 220 of the second client apparatus 200 (5000 ms in this example), and the parameter "nosmoking" indicates filtering the restaurant information based on the presence or absence of a no-smoking zone (seat). The parameter "sort" indicates the sorting order of the restaurants. Since the value of the parameter "sort" is set to "near", the restaurants are displayed in order from the nearest restaurant. The values of the parameters "latitude" and "longitude" are set to the latitude information and the longitude information acquired by the position detection section 160. Note that a parameter other than the above parameters may also be used.

The second client apparatus 200 that has received the request processes the request to generate the following request (5), and transmits the generated request to the synchronization server 420 (S407).

(5) http://websync.ne.jp/?app=gourmet&interval=5000&nosmoking=yes&sort=near&latitude=35&longitude=120&mac=00:FF:1B:AA:BB:DD Specifically, the request transmission destination is changed to the URL of the synchronization server 420 that has been received as the value of the parameter "url". The MAC address of the second client apparatus 200 is additionally set to the value of the parameter "mac". The information to which the MAC address is added is hereinafter appropriately referred to as "identification information-added parameter". The second client apparatus 200 can thus receive the setting that has been set using the first client apparatus 100, and transmit the setting to the synchronization server 420.

When the synchronization server 420 has received the above request, the synchronization server 420 generates an application in which parameters are set corresponding to the identification information-added parameter. The synchronization server 420 generates the application by reading the template of the application (or the template of the application execution information that is information for causing the second client apparatus to execute the application) from the template storage section 427, and embedding the identification information-added parameter in the template of the application. FIGS. 16A and 16B show specific examples of the application execution template and the application. FIG. 16A shows an example of the application execution template in which the values of the parameters are set to {{SORT}} and the like. FIG. 16B shows the application that is generated by embedding the received parameters in the template. The synchronization server 420 transmits the generated application to the second client apparatus 200 (S408).

Figures 17, 18:
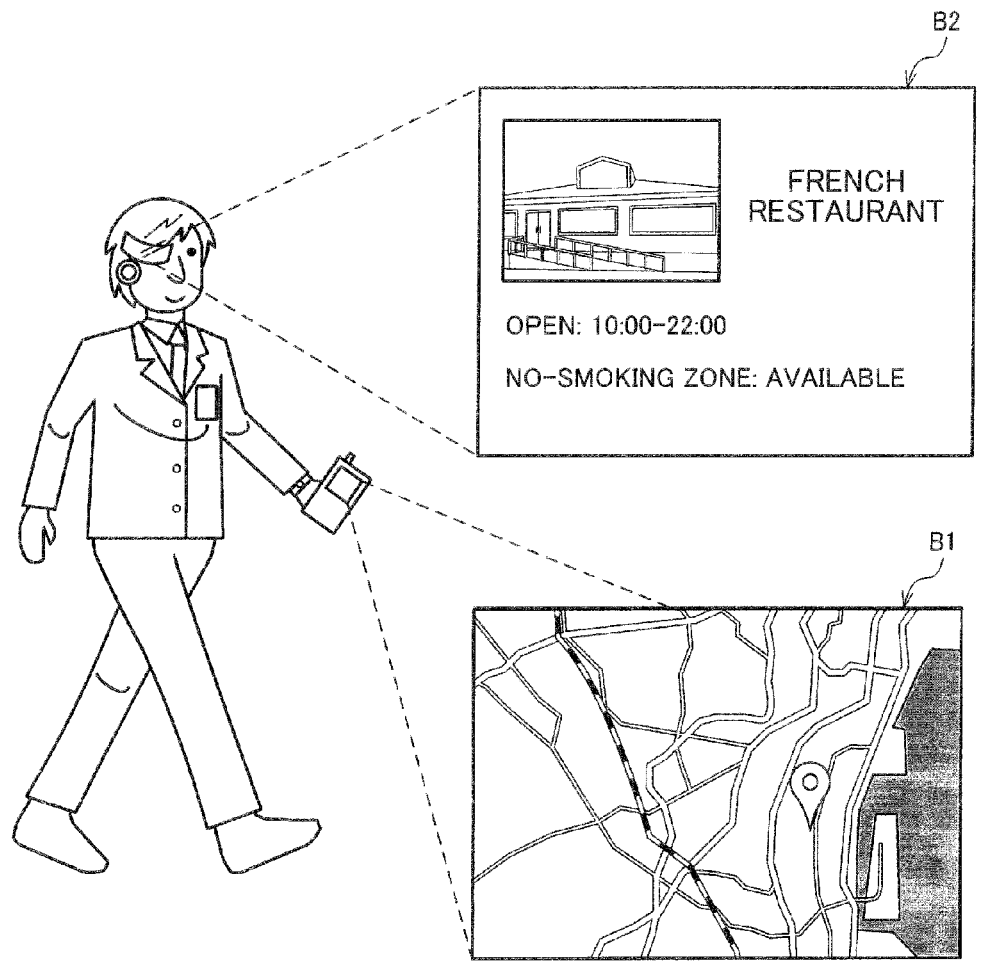
FIG. 17 shows an example of data acquired from a server system.
FIG. 18 shows a further example of an image displayed on a display section of a first client apparatus and a further example of an image displayed on a display section of a second client apparatus.

The second client apparatus 200 acquires data from the mashup server (data server 410 in a broad sense) by executing the received application (S409). FIG. 17 shows an example of the data transmitted from the mashup server. For example, data corresponding to one restaurant includes the name, the latitude, the longitude, and the address of the restaurant, and the URL of an image of the restaurant. The mashup server transmits data corresponding to a plurality of restaurants at one time. The data format may be a JSONP format or an XML format. The elements of the data are not limited to the name, latitude, longitude, and the like shown in FIG. 17.

A process that follows the step S409 is described below with reference to FIG. 13. When the second client apparatus 200 has acquired the data from the mashup server, the second client apparatus 200 generates display data for the second client apparatus based on the acquired data, and displays the display data on the display section 220 (S410). The second client apparatus 200 also generates display data for the first client apparatus based on the acquired data, and transmits the display data to the synchronization server 420 using the MAC address of the second client apparatus 200 as an argument (S411). The second client apparatus 200 transmits the following data, for example.

http://websync.ne.jp/?mac=00:FF:1B:AA:BB:DD&content=<HTML contents character string>

Note that "<HTML contents character string>" corresponds to the display data for the first client apparatus. For example, the following character string is written as "<HTML contents character string>".
<html><head><title>Map display</title></head><body>
<img src="http://map.com/?latitude=35&longitude=120"/></body></html>

The synchronization server 420 searches the session information stored in the session information storage section 425 based on the MAC address of the second client apparatus 200, and stores the display data for the first client apparatus in the corresponding data (right end in the example shown in FIG. 3) (S412). When the synchronization server 420 has successfully stored the display data, the synchronization server 420 transmits a response that indicates to that effect to the second client apparatus 200 (S413).

When the second client apparatus 200 has received the response from the synchronization server 420, the second client apparatus 200 redirects to the URL of the display data for the first client apparatus stored in the synchronization server 420 as a response to the request transmitted from the first client apparatus 100 in the step S406 (S414).

The first client apparatus 100 accesses the URL (redirect destination) of the display data for the first client apparatus stored in the synchronization server 420 (S415). When the synchronization server 420 has been accessed by the first client apparatus 100, the synchronization server 420 searches the session information stored in the session information storage section 425 based on the identification information (user name) about the first client apparatus, and transmits the corresponding display data for the first client apparatus (S416). The first client apparatus 100 then displays the received display data (S417).

FIG. 18 shows an example of the screen displayed on the display section 120 of the first client apparatus 100 and an example of the screen displayed on the display section 220 of the second client apparatus 200. For example, summary information about the restaurant is displayed on the second client apparatus 200 (see B2 in FIG. 18), and map information about the restaurant is displayed on the first client apparatus 100 (see B1 in FIG. 18).

The display process for the first restaurant ends when a given time has elapsed, and the second restaurant is displayed. The display change timing is set using the parameter "interval", for example. In this example, the first client apparatus 100 and the second client apparatus 200 stand by for 5000 ms (S419 and S420). When a given time has elapsed, the second client apparatus 200 generates display data for the second client apparatus based on the data about the second restaurant, and displays a summary of the second restaurant on the display section 220 (S410). The second client apparatus 200 then generates display data for the first client apparatus, and transmits the generated display data to the first client apparatus 100 (S411). The third and subsequent restaurants are displayed in the same manner as described above.

According to the second embodiment, the operation screen information includes the application setting operation screen information for setting the application executed by the second client apparatus 200 using the first client apparatus 100. The first client apparatus 100 transmits the parameter that has been set using the application setting operation screen to the second client apparatus 200. The second client apparatus 200 adds the identification information about the second client apparatus 200 to the received parameter to generate the identification information-added parameter, and transmits the identification information-added parameter to the synchronization server 420. The processing section 421 of the synchronization server 420 generates the application execution information based on the identification information-added parameter that has been received by the communication section 423.

FIG. 15 shows a specific example of the application setting operation screen. The application execution information is information for the second client apparatus 200 to execute the application in which the parameters have been set. The request that includes the parameters and is transmitted from the first client apparatus 100 to the second client apparatus 200 is the request (4), for example. The request that includes the identification information-added parameter and is transmitted from the second client apparatus 200 to the synchronization server 420 is the request (5), for example.

The parameters of the application executed by the second client apparatus 200 can thus be set using the first client apparatus 100 based on an operation performed using the operation screen. Since the application is generated by the synchronization server 420, the second client apparatus 200 normally accesses the synchronization server 420 using the parameter as an argument, and acquires the application from the synchronization server 420. However, since the parameter is set using the first client apparatus 100, the first client apparatus 100 accesses the second client apparatus 200 using the parameter as an argument, and the second client apparatus 200 accesses the synchronization server 420 using the received parameter as an argument after adding the identification information.

The system according to the second embodiment makes it possible to manage the application using the server system. Therefore, the maintenance operation, the update operation, and the like are facilitated as compared with the case where each client apparatus manages the application.

The second client apparatus 200 may receive the application execution information that has been generated by the processing section 421 of the synchronization server 420, and may acquire data from the data server 410 based on the application execution information. The second client apparatus 200 may generates the display data for the first client apparatus and the display data for the second client apparatus based on the acquired data. The display data for the first client apparatus and the display data for the second client apparatus are related data (e.g., data about an identical restaurant). The communication section 423 of the synchronization server 420 may receive the display data for the first client apparatus from the second client apparatus 200 together with the identification information about the second client apparatus 200.

The session information storage section 425 of the synchronization server 420 may search the session information based on the identification information about the second client apparatus 200 that has been received from the second client apparatus 200, and may store the display data for the first client apparatus that has been received from the second client apparatus 200 as data corresponding to the identification information.

The synchronization server 420 can thus receive the display data for the first client apparatus generated by the second client apparatus 200, and appropriately store the display data for the first client apparatus as the session information. More specifically, the synchronization server 420 links the first client apparatus 100 and the second client apparatus 200 using the session information, and stores the display data for the first client apparatus received from the second client apparatus 200 as the session information about the entry that corresponds to the second client apparatus 200 that has transmitted the display data.

The processing section 421 of the synchronization server 420 may link the first client apparatus 100 and the second client apparatus 200 based on the identification information (e.g., user name) about the first client apparatus and the session information when the synchronization server 420 has received a contents information request command from the first client apparatus 100. The processing section 421 of the synchronization server 420 may determine whether or not the display data for the first client apparatus that has been received from the second client apparatus 200 is response data that corresponds to the contents information request command based on the link result. The communication section 423 of the synchronization server 420 may transmit the display data for the first client apparatus to the first client apparatus 100 that has transmitted the contents information request command when it has been determined that the display data for the first client apparatus is response data that corresponds to the contents information request command.

The processing section 421 determines whether or not the display data for the first client apparatus is response data that corresponds to the contents information request command based on the session information. For example, the processing section 421 searches the session information based on the identification information about the first client apparatus 100, and determines whether or not the display data for the first client apparatus is stored corresponding to the entry that corresponds to the identification information about the first client apparatus 100. When the display data for the first client apparatus is stored corresponding to the entry that corresponds to the identification information about the first client apparatus 100, the stored data is transmitted to the first client apparatus 100. When the display data for the first client apparatus is not stored corresponding to the entry that corresponds to the identification information about the first client apparatus 100, empty data, error data, or the like is transmitted to the first client apparatus 100.

A plurality of screens can thus be displayed in a linked manner using the display section 120 of the first client apparatus 100 and the display section 220 of the second client apparatus 100. The above process is implemented by the steps S410 to S417 shown in FIG. 13. More specifically, when the data shown in FIG. 17 has been acquired, data that corresponds to the display example indicated by B2 in FIG. 18 is generated as the display data for the second client apparatus based on the name information and the image information, and data that corresponds to the display example indicated by B1 in FIG. 18 is generated as the display data for the first client apparatus based on the latitude information and the longitude information. Therefore, since related information can be displayed using a plurality of display sections (see FIG. 18), it is possible to compensate for the disadvantage (i.e., small screen) of the display section of each client apparatus.

The first client apparatus 100 may generate an application selection command based on an operation input performed using the application selection operation screen shown in FIG. 6B. The communication section 423 of the synchronization server 420 may receive the application selection command. The processing section 421 of the synchronization server 420 may link the first client apparatus 100 and the second client apparatus 200 based on the session information, and may generate the application setting operation screen information used for setting the application when the application is executed by the second client apparatus 200 that has been linked to the first client apparatus 100. The application is selected by the application selection command. The communication section 423 may transmit the application setting operation screen information generated by the processing section 421 to the first client apparatus.

The application setting operation screen information can thus be generated based on an operation performed using the application selection operation screen. An application that can be set using the application setting operation screen is the application selected using the application selection operation screen.

The first client apparatus 100 may set at least one of the address information about the second client apparatus, execution target application type information, and execution condition information about the application as the parameter for executing the application. The processing section 421 of the synchronization server 420 may generate the application execution information based on the parameter that has been set by the first client apparatus 100.

The execution target application type information corresponds to the parameter "app", for example. More specifically, the execution target application type information is information that indicates a gourmet application or the like. The execution condition information about the application indicates the condition when the application is executed. When the application is a gourmet application, the execution condition information about the application corresponds to the parameters "interval", "nosmoking", "sort", "latitude", "longitude", and the like.

Therefore, the type of application, the execution condition, and the client apparatus that executes the application can be determined using the application setting operation screen.

The processing section 421 of the synchronization server 420 may embed the parameter that has been set using the application setting operation screen and the identification information about the second client apparatus 200 in the template of the application execution information stored in the template storage section 427 to generate the application execution information.

This makes it possible to simplify the application generation process by utilizing the template. The application is written in JavaScript or the like (see FIGS. 16A and 16B). The application execution information is generated by replacing the tag (e.g., {{SORT}}) with the parameter.

4. Third Embodiment

An example in which the first client apparatus and the second client apparatus directly communicate with each other, and acquire the display data for the first client apparatus and the display data for the second client apparatus is described below as a modification of the second embodiment. A system configuration example will be described first, and the details of a process will then be described using a flowchart.

4.1 System Configuration Example

FIG. 10 shows a configuration example of a system that includes a server system 400 according to the third embodiment. The system includes a first client apparatus 100, a second client apparatus 200, a gateway 300, and a server system 400. Note that the system is not limited to the configuration shown in FIG. 10. Various modifications may be made, such as omitting some of the elements shown in FIG. 10 or adding other elements.

The system configuration example according to the third embodiment is the same as that according to the second embodiment (see FIG. 10). Therefore, detailed description thereof is omitted.

4.2 Details of Process

The details of a process are described below using a flowchart. The user registration process shown in FIG. 2 or the login process shown in FIG. 7 is performed in the same manner as described above. A process shown in FIGS. 19 and 20 is performed after completion of the user registration process or the login process.

In the third embodiment, the process performed in the steps S401 to S410 according to the second embodiment is performed in steps S501 to S510. Detailed description of the steps S501 to S510 is omitted.

When the second client apparatus 200 has displayed a summary on the display section 220 in the step S510, the second client apparatus 200 generates the display data for the first client apparatus based on the acquired data, and transmits the display data for the first client apparatus to the first client apparatus 100. The above response makes a pair with the request transmitted in the step S506.

The first client apparatus 100 displays the contents for the first client apparatus based on the display data for the first client apparatus received from the second client apparatus 200. FIG. 18 shows an example of the screen displayed on the display section 120 of the first client apparatus 100 and an example of the screen displayed on the display section 220 of the second client apparatus 200.

The display process for the first restaurant ends when a given time has elapsed, and the second restaurant is displayed. The display change timing is set using the parameter "interval", for example. In this example, the first client apparatus 100 and the second client apparatus 200 stand by for 5000 ms (S513 and S514). When a given time has elapsed, the second client apparatus 200 generates the display data for the second client apparatus based on the data about the second restaurant, and displays a summary of the second restaurant on the display section 220. The second client apparatus 200 then generates the display data for the first client apparatus, and transmits the generated display data to the first client apparatus 100 as a response to the access in the step S515 (S516). The above process is similarly performed on the third and subsequent restaurants.

The first to third embodiments according to the invention have been described above. Note that the invention is not limited to the first to third embodiments. Various modifications and variations may be made of the elements without departing from the scope of the invention. A plurality of elements of each of the first to third embodiments may be appropriately combined. For example, some of the elements described above in connection with each of the first to third embodiments may be omitted. The elements described in connection with different embodiments may be appropriately combined. Specifically, various modifications and applications are possible without materially departing from the novel teachings and advantages of the invention.

What is claimed is:

1. A server system for linking a first client apparatus and a second client apparatus, the server system comprising:
    a server comprising hardware, wherein the server is configured to implement:
        a session information storage section configured to:
            store identification information about the second client apparatus upon startup of the second client apparatus, wherein the identification information about the second client apparatus comprises:
                information that uniquely identifies the second client apparatus; and
                address information about the second client apparatus;
            store identification information about the first client apparatus; and
            store session information linking the identification information about the first client apparatus with the identification information about the second client apparatus;
        a processing section configured to generate operation screen information based on the session information, wherein the operation screen information comprises:
            information for providing an operation screen on the first client apparatus, wherein the operation screen is used to operate the second client apparatus; and
            the address information about the second client apparatus; and
        a communication section configured to transmit the operation screen information to the first client apparatus,
    wherein, after the session information storage section stores the identification information about the second client apparatus, the communication section is configured to transmit information to the second client apparatus to prompt the second client apparatus to display:
        address information about the server; and
        the information that uniquely identifies the second client apparatus, on a display of the second client apparatus,
    wherein the communication section is configured to receive:
        the identification information about the first client apparatus; and
        the information that uniquely identifies the second client apparatus, transmitted by the first client apparatus based on input to the first client apparatus of the information that uniquely identifies the second client apparatus displayed by the second client apparatus, and
    wherein the session information storage section is configured to store as the session information:
        the identification information about the first client apparatus; and
        the information that uniquely identifies the second client apparatus, received from the first client apparatus.

2. The server system according to claim 1,
    wherein the operation screen information comprises application setting operation screen information for setting an application that is to be executed by the second client apparatus,
    wherein the communication section is configured to receive an identification information-added parameter from the second client apparatus, wherein the identification information-added parameter comprises:
        a parameter, transmitted by the first client apparatus to the second client apparatus, for executing the application that has been set using an application setting operation screen provided on the first client apparatus based on the application setting operation screen information; and
        the information that uniquely identifies the second client apparatus; and
    wherein the processing section is configured to generate application execution information based on the identification information-added parameter, wherein the application execution information is information for the second client apparatus to execute the application.

3. The server system according to claim 2, wherein the communication section is configured to receive from the second client apparatus:
    display data for the first client apparatus generated by the second client apparatus based on the second client apparatus executing the application; and
    the identification information about the second client apparatus, and
    wherein the display data for the first client apparatus is related to display data for the second client apparatus generated by the second client apparatus.

4. The server system according to claim 3,
    wherein the communication section is configured to receive a contents information request command from the first client apparatus,
    wherein, after the communication section receives the contents information request command from the first client apparatus, the processing section is configured to determine, based on the session information, whether or not the display data for the first client apparatus that has been generated by the second client apparatus is response data that corresponds to the contents information request command, and
    wherein, after the processing section determines, based on the session information, that the display data for the first client apparatus is the response data that corresponds to the contents information request command, the communication section is configured to transmit the display data for the first client apparatus to the first client apparatus.

5. The server system according to claim 1,
    wherein the operation screen information comprises:
        instrument operation screen information for operating the second client apparatus; and
        application selection operation screen information for selecting the application that is to be executed by the second client apparatus,
    wherein, after the session information storage section stores the session information linking the identification information about the first client apparatus and the identification information about the second client apparatus, the processing section is configured to generate the instrument operation screen information and the application selection operation screen information that correspond to the second client apparatus, and wherein the communication section is configured to transmit the instrument operation screen information and the application selection operation screen information that have been generated by the processing section to the first client apparatus.

6. The server system according to claim 5,
wherein the communication section is configured to receive an application selection command from the first client apparatus, wherein the application selection command is based on an operation input performed using an application selection operation screen that is provided on the first client apparatus based on the application selection operation screen information, wherein after the session information storage section stores the session information linking the identification information about the first client apparatus with the identification information about the second client apparatus, the processing section is configured to generate application setting operation screen information used for setting the application that has been selected corresponding to the application selection command when the application is executed by the second client apparatus, and wherein the communication section is configured to transmit the application setting operation screen information generated by the processing section to the first client apparatus.

7. The server system according to claim 2, wherein the parameter transmitted by the first client apparatus to the second client apparatus is at least one of:
    address information about the second client apparatus;
    execution target application type information about the application; and
    execution condition information about the application.

8. The server system according to claim 1,
wherein the communication section is configured to receive from the first client apparatus:
    the identification information about the first client apparatus; and
    the information that uniquely identifies the second client apparatus, and
wherein the session information storage section is configured to store the session information linking the identification information about the first client apparatus with the information that uniquely identifies the second client apparatus.

9. The server system according to claim 1,
wherein the server is further configured to implement a template storage section configured to store:
    a template of contents information to be displayed on at least one of the first client apparatus and the second client apparatus; and
    a template of application execution information about an application that is to be executed by the second client apparatus, and
wherein the processing section is configured to generate at least one of:
    contents information based on the template of contents information; and
    application execution information based on the template of application execution information.

10. The server system according to claim 9,
wherein the template storage section is configured to store a template of the operation screen information, and wherein the processing section is configured to generate the operation screen information as the contents information by embedding the address information about the second client apparatus in the template of the operation screen information stored in the template storage section.

11. The server system according to claim 9,
wherein the processing section is configured to generate the application execution information by embedding:
    a parameter that has been set using an application setting operation screen provided by the first client apparatus; and
    the identification information about the second client apparatus, in the template of the application execution information.

12. A method for linking a first client apparatus and a second client apparatus by a server, the method comprising:
    storing, by the server, identification information about the second client apparatus upon startup of the second client apparatus, wherein the identification information about the second client apparatus comprises:
        information that uniquely identifies the second client apparatus; and
        address information about the second client apparatus;
    after storing the identification information about the second client apparatus, transmitting, by the server, information to the second client apparatus to prompt the second client apparatus to display:
        address information about the server; and
        the information that uniquely identifies the second client apparatus, on a display of the second client apparatus;
    receiving, by the server:
        identification information about the first client apparatus; and
        the information that uniquely identifies the second client apparatus, transmitted by the first client apparatus based on input to the first client apparatus of the information that uniquely identifies the second client apparatus displayed by the second client apparatus;
    storing, by the server, the identification information about the first client apparatus;
    storing, by the server, session information linking the identification information about the first client apparatus with the information that uniquely identifies the second client apparatus,
received from the first client apparatus;
    generating, by the server, operation screen information based on the session information, wherein the operation screen information comprises:
        information for providing an operation screen on the first client apparatus, wherein the operation screen is used to operate the second client apparatus; and
        the address information about the second client apparatus; and
    transmitting, by the server, the operation screen information to the first client apparatus.

13. The server system according to claim 1, wherein the operation screen information comprises information for displaying the operation screen on a mobile phone as the first client apparatus, wherein the operation screen is used to operate a head-mounted display as the second client apparatus.

14. The server system according to claim 2, wherein the application execution information is information for a head-mounted display as the second client apparatus to execute the application.

* * * * *